United States Patent
Kudo

(10) Patent No.: US 11,906,894 B2
(45) Date of Patent: Feb. 20, 2024

(54) LENS CONTROL DEVICE AND LENS CONTROL METHOD

(71) Applicant: Olympus Corporation, Hachioji (JP)

(72) Inventor: Yasunori Kudo, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 17/579,533

(22) Filed: Jan. 19, 2022

(65) Prior Publication Data

US 2022/0137487 A1    May 5, 2022

Related U.S. Application Data

(63) Continuation of application No. PCT/JP2019/029417, filed on Jul. 26, 2019.

(51) Int. Cl.
    *G03B 5/04*       (2021.01)
    *H02P 8/14*       (2006.01)

(52) U.S. Cl.
    CPC .............. *G03B 5/04* (2013.01); *H02P 8/14* (2013.01); *G03B 2205/0084* (2013.01)

(58) Field of Classification Search
    CPC .............. G03B 5/04; G03B 2205/0053; G03B 2205/0084; H02P 8/14
    See application file for complete search history.

(56) References Cited

U.S. PATENT DOCUMENTS

2001/0012074 A1   8/2001   Ohkawara
2014/0293440 A1*   10/2014   Okawa ................ G02B 15/145
                                                         359/698

FOREIGN PATENT DOCUMENTS

JP     2008-191479     8/2008
JP     2010-211175     9/2010

OTHER PUBLICATIONS

International Search Report to corresponding International Application No. PCT/JP2019/029417 (2 pgs.), with translation (2 pgs.).

* cited by examiner

*Primary Examiner* — Minh Q Phan
(74) *Attorney, Agent, or Firm* — John C. Pokotylo; Pokotylo Patent Services

(57) ABSTRACT

A lens control device, comprising a first stepping motor that drives a zoom lens contained in the photographing lens, a second stepping motor that drives a focus lens contained in the photographing lens, and a processor that controls the first stepping motor and the second stepping motor, whereby, within a given section in which the zoom lens and the focus lens are driven, there is a period in which at least one of the first stepping motor and the second stepping motor is driven at a constant rate, and the processor makes a time, required to move the specified section with a specified number of pulses, a specified time.

22 Claims, 19 Drawing Sheets

REFERENCE POSITION
(REFLECTING SURFACE RIGHT SIDE
EDGE REFERENCE)

FIG. 5
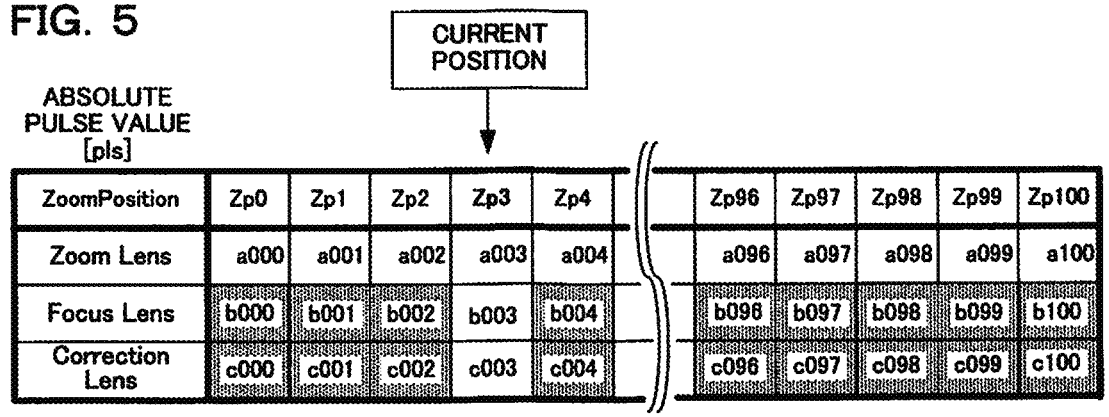
FIG. 6
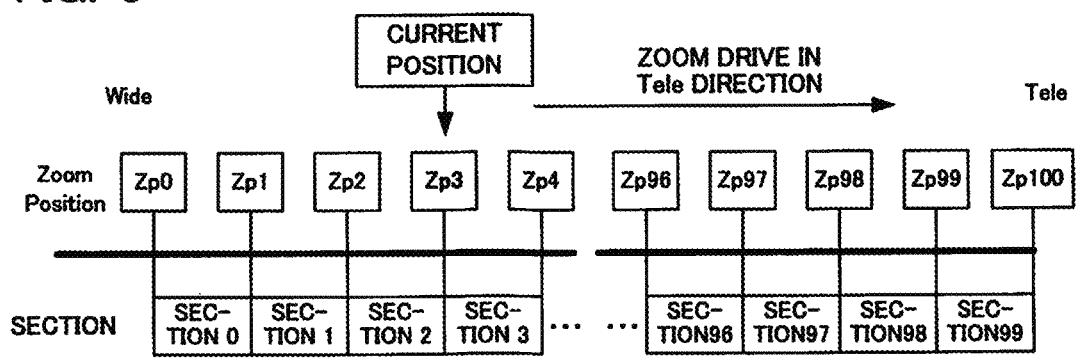
FIG. 7
SECTION PULSE VALUE [pls]
| SECTION NAME | SECTION0 | SECTION1 | SECTION2 | SECTION3 | SECTION4 | SECTION96 | SECTION97 | SECTION98 | SECTION99 |
|---|---|---|---|---|---|---|---|---|---|
| Zoom Lens | ad000 | ad001 | ad002 | ad003 | ad004 | ad096 | ad097 | ad098 | ad099 |
| Focus Lens | bd000 | bd001 | bd002 | bd003 | bd004 | bd096 | bd097 | bd098 | bd099 |
| Correction Lens | cd000 | cd001 | cd002 | cd003 | cd004 | cd096 | cd097 | cd098 | cd099 |

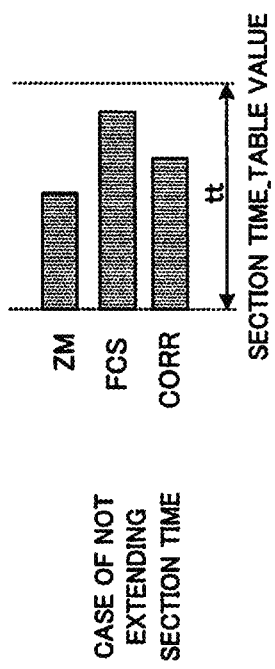
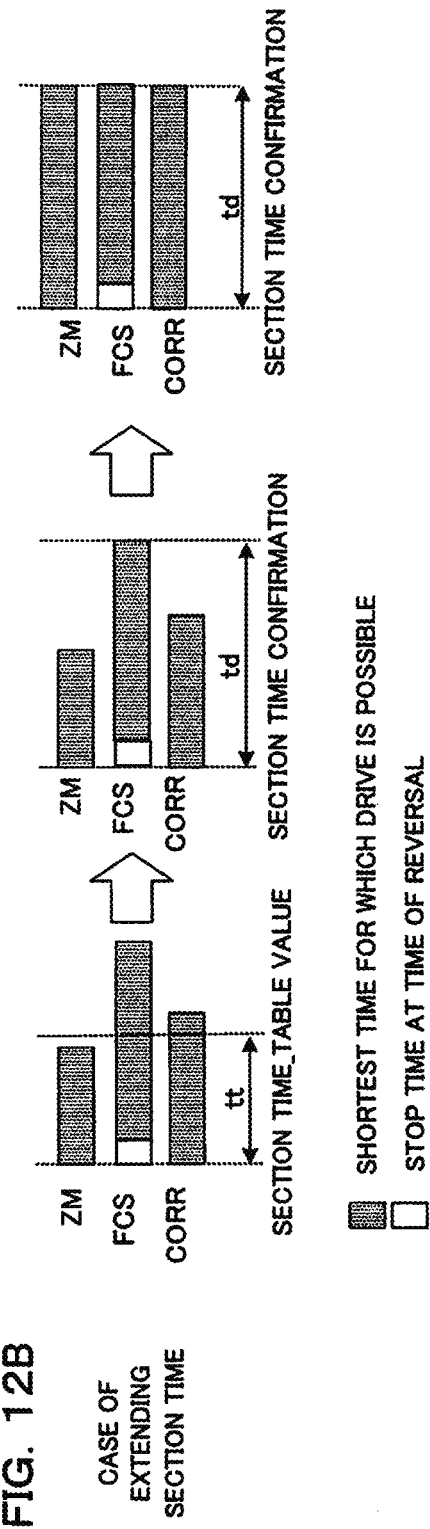
FIG. 12A
CASE OF NOT EXTENDING SECTION TIME
FIG. 12B
CASE OF EXTENDING SECTION TIME FIG. 13A  HIGHEST SPEED LIMIT [pls/μs]

| SECTION NAME | SECTION 0 | SECTION 1 | SECTION 2 | SECTION 3 | SECTION 4 | SECTION 96 | SECTION 97 | SECTION 98 | SECTION 99 |
|---|---|---|---|---|---|---|---|---|---|
| ZOOM LENS | La0 | La1 | La2 | La3 | La4 | La96 | La97 | La98 | La99 |
| FOCUS LENS | Lb0 | Lb1 | Lb2 | Lb3 | Lb4 | Lb96 | Lb97 | Lb98 | Lb99 |
| CORRECTION LENS | Lc0 | Lc1 | Lc2 | Lc3 | Lc4 | Lc96 | Lc97 | Lc98 | Lc99 |

FIG. 13B  HIGHEST SPEED LIMIT [pls/μs] (FOR LOW TEMPERATURE)

| SECTION NAME | SECTION 0 | SECTION 1 | SECTION 99 |
|---|---|---|---|
| ZOOM LENS | Lat0 | Lat1 | Lat99 |
| FOCUS LENS | Lbt0 | Lbt1 | Lbt99 |
| CORRECTION LENS | Lct0 | Lct1 | Lct99 |

FIG. 13C  UNIT PULSE [pls] FOR ACCELERATION AND DECELERATION STAGE

| ZOOM LENS | Las |
|---|---|
| FOCUS LENS | Lbs |
| CORRECTION LENS | Lcs |

FIG. 14　　SECTION TIME_TABLE [μs]

| SECTION NAME | SECTION 0 | SECTION 1 | SECTION 2 | SECTION 3 | SECTION 4 | | SECTION 96 | SECTION 97 | SECTION 98 | SECTION 99 |
|---|---|---|---|---|---|---|---|---|---|---|
| SPEED A | ta0 | ta1 | ta2 | ta3 | ta4 | | ta96 | ta97 | ta98 | ta99 |
| SPEED B | | | | | | | | | | |
| ... | | | | | ... | | | | | |
| SPEED F | | | | | | | | | | |
| SPEED G | tg0 | tg1 | tg2 | tg3 | tg4 | | tg96 | tg97 | tg98 | tg99 |

LENS CONTROL DEVICE AND LENS CONTROL METHOD

CROSS-REFERENCE TO RELATED APPLICATIONS

This application is a Continuation Application of PCT Application No. PCT/JP2019/029417, filed on Jul. 26, 2019, the entire contents of all of which are incorporated herein by reference.

BACKGROUND OF THE INVENTION

1. Field of the Invention

The present invention relates to a lens control device and a lens control method that are capable of controlling a plurality of lenses in respectively independent states, and capable of displaying and/or storing live view images and movie images while zooming.

2. Description of the Related Art

Conventionally, an imaging device is known in which a plurality of lens groups are driven simultaneously by individual motors. For example, the imaging device disclosed in Japanese patent laid-open No. 2010-211175 (hereafter referred to as "patent publication 1") has a DC motor A (DCMA) for drive of a zoom lens A, a stepping motor B (STMB) for drive of a zoom lens B, and an STMC for drive of a focus lens C. The STMB is driven in synchronism with position detection pulses of the DCMA, and position of lens B is confirmed for every position detection pulse. The STMB is driven a normal synchronous drive amount by one pulse, and if position of the lens B becomes closer to a short range than a specified distance, and a distance between the lens B and the lens A is wider, drive speed is accelerated by changing synchronous drive amount of the STMB from the normal synchronous drive amount (1 pulse drive) to a high speed synchronous drive amount (3 pulse drive). By performing this type of drive control it is possible to prevent interference and divergence between each lens group, and it is possible to prevent step-out.

The imaging device disclosed in patent publication 1 performs control so that during zoom drive respective lens positions, within a specified section, approach a specified position. However, in patent publication 1 it is only disclosed that interference between lenses is prevented, and there is no description of improving the appearance of live view images and movie images by ensuring precision of respective lens positions during zoom drive.

SUMMARY OF THE INVENTION

The present invention provides a lens control device and lens control method that ensure precision of lens positions during lens drive, and improve appearance of live view images and/or movie images.

A lens control device of a first aspect of the present invention has a photographing lens that is capable of zoom and focus, and comprises a first stepping motor that drives a zoom lens contained in the photographing lens, a second stepping motor that drives a focus lens contained in the photographing lens, and a processor that is capable of setting drive times in accordance with a specified control unit time for each of respective drive pulses of the first stepping motor and the second stepping motor, and that controls the first stepping motor and the second stepping motor, whereby, within a given section in which the zoom lens and the focus lens are driven, there is a period in which at least one of the first stepping motor and the second stepping motor is driven at a constant rate, and the processor, sets a time of the period, in order to make a time, required to drive at least one of the first stepping motor and the second stepping motor in the given section with a specified number of pulses, a specified time, when a drive time, that has been derived by dividing the time of the period by a number of pulses in the period, is made average drive time, divides the period into a plurality of periods, and sets a plurality of the drive times either side of the average drive time to the drive pulses of the plurality of periods.

A lens control method of a second aspect of the present invention, is a lens control method for an imaging device that comprises a photographing lens that is capable of zoom and focus, a first stepping motor that drives a zoom lens contained in the photographing lens, and a second stepping motor that drives a focus lens contained in the photographing lens, this lens control method comprising being able to set drive times in accordance with a specified control unit time for each of respective drive pulses of the first stepping motor and the second stepping motor, and, when controlling the first stepping motor and the second stepping motor, within a given section in which the zoom lens and the focus lens are driven, having a period in which at least one of the first stepping motor and the second stepping motor is driven at a constant rate, and, setting a time of the period, in order to make a time, required to drive at least one of the first stepping motor and the second stepping motor in the given section with a specified number of pulses, a specified time, when a drive time, that has been derived by dividing the time of the period by a number of pulses in that period, is made average drive time, dividing the period into a plurality of periods, and setting a plurality of the drive times either side of the average drive time to the drive pulses of the plurality of periods, in order to make a time.

A non-transitory computer-readable medium of a third aspect of the present invention, storing a processor executable code, which when executed by at least one processor, this processor being provided in an imaging device that comprises a photographing lens that is capable of zoom and focus, a first stepping motor that drives a zoom lens contained in the photographing lens, and a second stepping motor that drives a focus lens contained in the photographing lens, performs a lens control method, the lens control method comprising: being able to set drive times in accordance with specified control unit time for each of respective drive pulse of the first stepping motor and the second stepping motor, and, when controlling the first stepping motor and the second stepping motor, within a given section in which the zoom lens and the focus lens are driven, having a period in which at least one of the first stepping motor and the second stepping motor is driven at a constant rate, and, setting a time of the period, in order to make a time, required to drive at least one of the first stepping motor and the second stepping motor in the given section with a specified number of pulses, a specified time, when a drive time, that has been derived by dividing the time of the period by a number of pulses in the period, is made average drive time, dividing the period into a plurality of periods, and setting a plurality of the drive times either side of the average drive time to the drive pulses of the plurality of periods.

BRIEF DESCRIPTION OF THE DRAWINGS

FIG. 5 is a table showing lens position, for respective zoom positions, in the camera of one embodiment of the present invention.

FIG. 6 is a table showing a relationship between zoom position and section, in the camera of one embodiment of the present invention.

FIG. 7 is a table showing number of section pulses, for respective zoom positions, in the camera of one embodiment of the present invention.

FIG. 12A and FIG. 12B are drawings for describing extension of section time for each lens, with the camera of one embodiment of the present invention.

FIG. 13A to FIG. 13C are tables showing maximum speed limit, for respective zoom positions, in the camera of one embodiment of the present invention.

FIG. 14 is a table showing section time, for respective zoom positions, in the camera of one embodiment of the present invention.

DETAILED DESCRIPTION OF THE PREFERRED EMBODIMENTS

An example where a digital camera (hereafter simply called "camera") is adopted as one embodiment of the present invention will be described in the following. This camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. If the photographer operates a release button, image data that has been acquired by an imaging section is stored in a storage medium. Image data that has been stored in the storage medium is displayed as a playback image on the display section if the photographer selects playback mode.

Also, this camera performs position control by driving a zoom lens, focus lens, and correction lens (for field curvature correction, for example) with respectively independent stepping motors. Between the wide-angle end and the telephoto end of a zoom lens is finely divided into specified "sections" (refer to FIG. 6). When driving each lens, in a case where there is a lens that cannot be driven for a "reference section time" that has been predetermined for each section, drive time for a section corresponding to the lens that is furthest away is lengthened, and drive time of a section is confirmed (refer to S31 and S33 in FIG. 11, and to FIG. 12A and FIG. 12B, for example).

Each stepping motor is subjected to time adjustment by controlling pulses applied to the stepping motor, in order to drive each section for the drive time that was confirmed as described above ("confirmed drive time"). An acceleration period and a deceleration period of the stepping motor are constrained by load and motor characteristics, and cannot be used in time adjustment, and so time adjustment is performed in a constant speed period. Time adjustment is performed with a pulse distribution for "two drive times" determined by control resolution either side of "average drive time", which is an ideal drive time, and suppresses errors in actual operation with respect to "confirmed drive time" (refer, for example, to FIG. 18 to FIG. 22, which will be described later).

Figure 1:
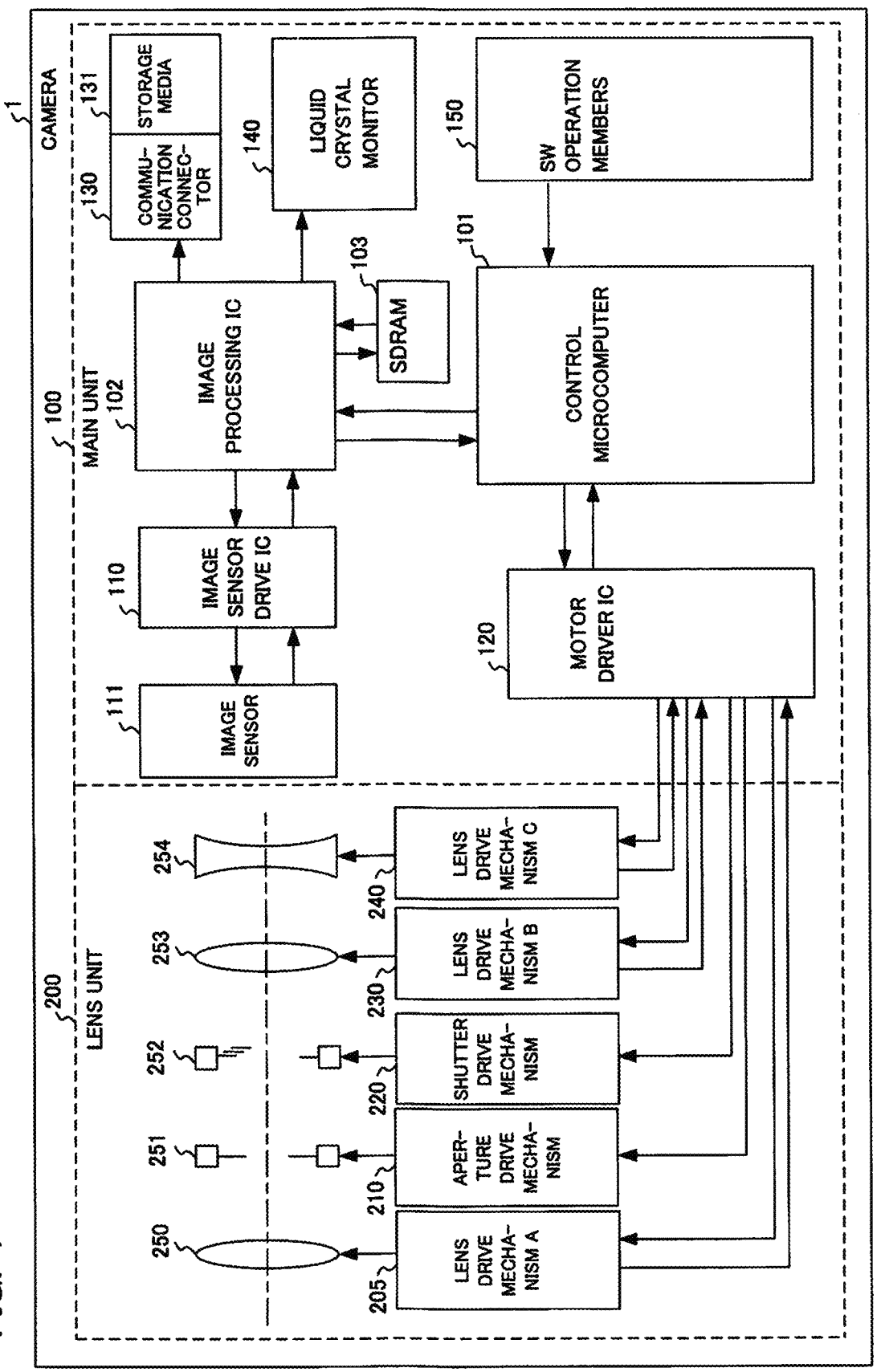
FIG. 1 is a block diagram mainly showing the electrical structure of a camera of one embodiment of the present invention.

FIG. 1 is a block diagram mainly showing the electrical structure of a camera 1 of one embodiment of the present invention. This camera 1 comprises a main unit 100 and a lens unit 200. Although the lens unit 200 and the main unit 100 may be constituted separately, they will be described here as being formed integrally.

A zoom lens 250, focus lens 253, and correction lens 254 are provided as a photographing lens within the lens unit 200. The zoom lens 250 is moved in the optical axis direction by a lens drive mechanism A205, and adjusts focal length. The focus lens 253 is moved in the optical axis direction by a lens drive mechanism B230, and adjusts focus. The correction lens 254 is moved in the optical axis direction by a lens drive mechanism C240, and corrects optical aberration (for example, field curvature aberration). The lens drive mechanism A205, lens drive mechanism B230, and lens drive mechanism C240 have stepping motors as mechanisms and drive sources for moving each of the lenses. Details of these drive mechanisms will be described later using FIG. 2.

An aperture 251 and shutter 252 are arranged on the optical axis of the zoom lens 250, focus lens 253, and correction lens 254. The aperture 251 has opening diameter changed by an aperture drive mechanism 210, in order to adjust large amount of light flux that has passed through the photographing lens. When aperture state is unclear, such as immediately after power up etc., the aperture 251 is temporarily driven one step at a time by a stepping motor from a fully closed state to a wide-open state. As a result of this drive it is possible to put the aperture in a wide-open state, no matter what state the aperture is in. This operation is called "aperture reset drive". After being opened once, aperture state is managed by counting a number of steps the aperture has been driven by, with the wide-open position as a reference.

The shutter 252 adjusts a time for which light flux passes through the photographing lens, using a shutter drive mechanism 220. The shutter 252 is driven by a moving magnet coil (not shown) that is provided within the shutter drive mechanism 220. The shutter 252 is controlled by an H-bridge circuit that is provided in a motor drive IC (Integrated Circuit) 120, and if provided with power in one direction the shutter 252 is opened, and if supplied with power in the opposite direction the shutter 252 performs blocking of light.

The lens drive mechanism A205, aperture drive mechanism 210, shutter drive mechanism 220, lens drive mechanism B230, and lens drive mechanism C240 are connected to the motor drive IC 120 that is arranged within the main unit 100. The motor drive IC 120 receives signals such as lens position information from the lens drive mechanism A205, lens drive mechanism B230, and lens drive mechanism C240, and outputs these items of information to a control microcomputer 101. Also, the motor drive IC 120 has drive circuits (such as the H bridge circuit for example), for driving actuators such as stepping motors that are arranged within the lens drive mechanism A205, aperture drive mechanism 210, shutter drive mechanism 220, lens drive mechanism B230, and lens drive mechanism C240, and drives of the actuators for each stepping motor are controlled in accordance with control signals from the control microcomputer 101. A drive method for the stepping motors is to transition an excitation state on every clock edge (or pulse), and drive the stepping motor by an amount corresponding to the clock. With this embodiment, description will be given for a case where, if a single pulse is applied to the motor drive IC excitation state of the stepping motor is subjected to a one-step transition, and a motor axis is rotatably driven by a one-step amount. Hereafter units representing lens movement amount will be described as "pulses".

A stepping motor provided within the lens drive mechanism A205 functions as a first stepping motor for driving the zoom lens 250 contained in the photographing lens. Also, a stepping motor provided within the lens drive mechanism B230 functions as a second stepping motor for driving the focus lens 253 contained in the photographing lens. It is possible to set a drive time in accordance with respective specified control time units for each one drive pulse of the first stepping motor and the second stepping motor. The lens drive mechanism C240 functions as a third stepping motor for driving the correction lens 254 contained in the photographing lens. In a case of a photographing lens that contains first and second zoom lenses, the third stepping motor may drive the second zoom lens. In a case where the photographing lens contains a second zoom lens and a correction lens, third and fourth stepping motors may be arranged to drive the respective lenses.

An image sensor 111 is arranged within the main unit 100, close to a position where a subject image is formed on the optical axis of the photographing lens. The image sensor 111 is an image sensor such as a CCD (Charge Coupled Device) or CMOS (Complementary Metal-Oxide-Semiconductor) image sensor etc. The image sensor has photodiodes arranged two dimensionally, with each photodiode subjecting a subject image to photoelectric conversion and outputting a photoelectric conversion signal (analog signal). The image sensor 111 is connected to an image sensor drive IC 110, and this image sensor drive IC 110 performs control of exposure time of the image sensor 111, and readout of the photoelectric conversion signal (analog signal). The image sensor drive IC 110 performs processing such as A/D conversion on a photoelectric conversion signal that has been read out, and outputs to an image processing IC 102.

The image processing IC 102 generates image data from an image signal has been output from the image sensor drive IC, and saves this image data that has been generated in SDRAM (Synchronous Dynamic Random Access Memory). When generating image data, various image processing is applied, such as exposure correction and noise processing, WB (White Balance) gain correction, edge enhancement, and false color correction etc. Further, the image processing IC 102 also performs processing (development processing) to convert image data that has been subjected to the above described image processing to a stored data format.

Image data that has been processed for storage by the image processing IC 102 is stored in storage media 131 by means of a communication connector 130. The storage media 131 is storage medium that can be inserted and removed to and from the main unit 100, and the communication connector 130 can store image data in the storage media, and readout image data from the storage media.

Image data that has been processed for live view display or for playback display by the image processing IC 102 is output to a liquid crystal monitor 140, and the liquid crystal monitor 140 displays images. Images such as menu images etc. may also be displayed on the liquid crystal monitor 140. It should be noted that the liquid crystal monitor 140 is not limited to liquid crystal, and may also be another display monitor, such as organic EL.

An operation member 150 is a user interface for the user to instruct the camera 1, and has switches, dials and a touch panel etc., and detection circuitry to detect state of these various switches and dials etc. As the operation member 150 there are, for example, a power supply on-off switch, release button, zoom operation switch, and touch panel provided on the front surface of the liquid crystal monitor 140, etc. The zoom operation switch has a center position, wide side position and telephoto side position, and zoom operation is performed by the user turning the zoom operation switch to the wide end position or the telephoto end position.

The control microcomputer 101 is a processor that has a CPU (Central Processing Unit) and peripheral circuits etc. for the CPU, and memory etc. The CPU implements the overall control of the camera by controlling each of the sections within the camera 1 in accordance with programs stored in memory. For example, the control microcomputer 101 commences operation of the camera 1 based on a power supply on-off signal from the operation member 150, and displays live view images on the liquid crystal monitor 140. Also, the control microcomputer 101 executes calculations etc. for focusing operations and correct exposure based on a half-press operation signal of the release button. Also, if the zoom operation switch is operated the control microcomputer 101 drives the zoom lens 250 in the zoom direction of the switch that has been operated (wide side position or telephoto side position) using the lens drive mechanism A205. Also, in conformity with movement of the zoom lens 250 the control microcomputer 101 moves the focus lens 253 to a position that maintains a subject distance that achieves focus (distance from the camera to a focus position), and moves the correction lens 254 to a position where it is possible to appropriately correct aberration.

Besides the control sections for controlling overall operation of the camera, there are also functions for a counting section, mode setting section, detection section, determination section and calculation section etc. within the control microcomputer 101. It should be noted that the motor drive IC 120, a camera operation switch (SW) 150, and a power supply, that is not illustrated, are connected to the control microcomputer 101.

The control microcomputer 101 functions as a control section (processor) that controls the first stepping motor for driving a zoom lens, and the second stepping motor four driving a focus lens. When controlling the stepping motors, there is a period in which at least one of the first stepping motor and the second stepping motor are driven at a constant speed (refer, for example, to the constant speed period Tc in FIG. 19 and FIG. 22), within a period in which the zoom lens and the focus lens are driven through a specified section (refer to the confirmed section time td in FIG. 12B, and target drive time Tmov_tar in FIG. 22). This control section (processor), when a drive time, that has been derived by dividing drive time for all drive pulses of a period in which there is drive at constant speed by a number of pulses in that period, is made average drive time, divides the period in which there is drive at a constant rate into a plurality of periods, and sets a plurality of the drive times either side of the average drive time to the drive pulses of the plurality of periods (refer to FIG. 19 and FIG. 22, for example), in order to make a time, required to move the given section with a specified number of pulses, a specified time (refer to confirmed section time td in FIG. 12B, for example).

Figure 11:
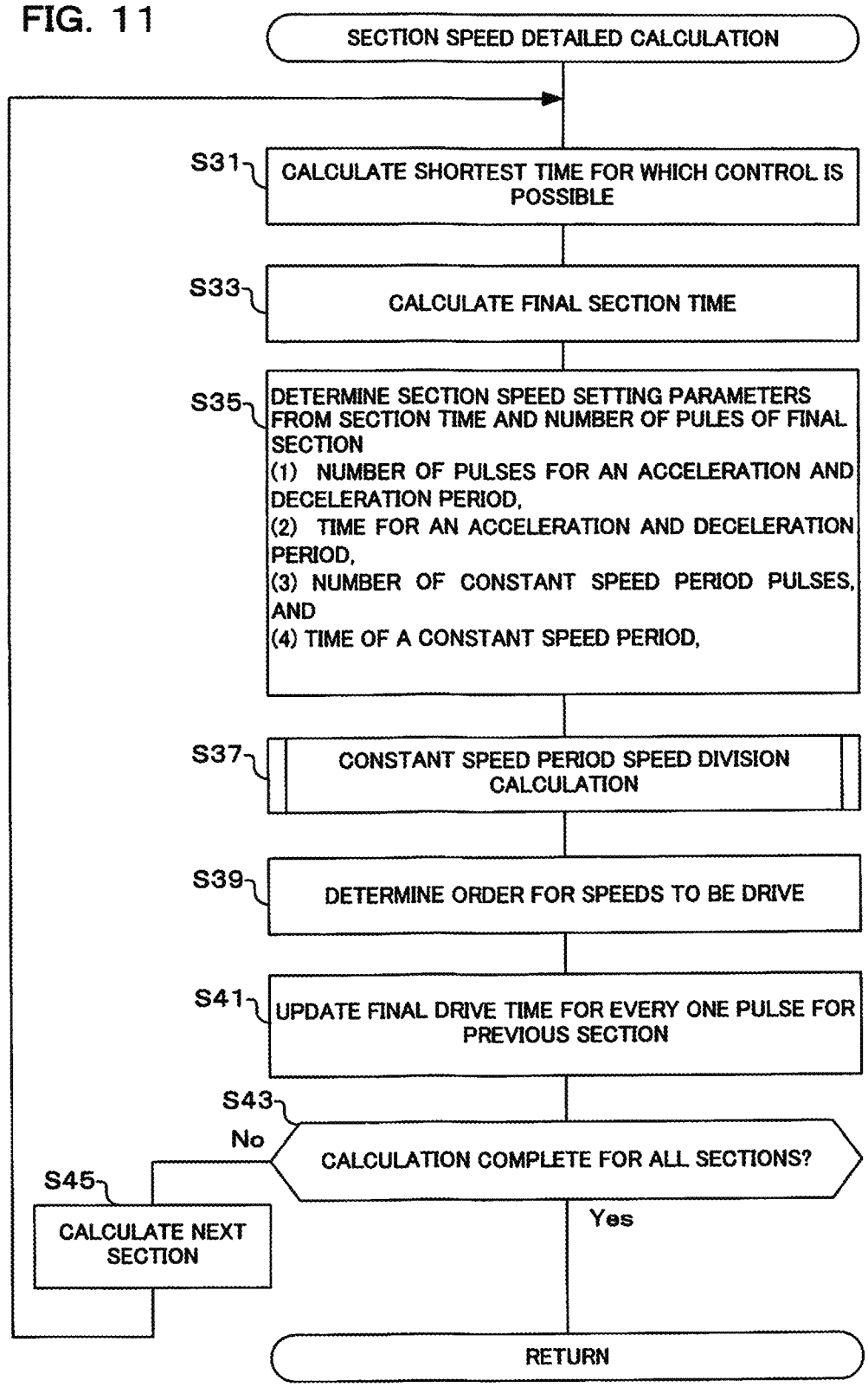
FIG. 11 is a flowchart showing detailed calculation for section speed, in the camera of one embodiment of the present invention.

Also, the control section (processor) divides a range in which zoom position of the zoom lens can be changed into a plurality of sections, respectively calculates shortest time for which movement of the zoom lens and focus lens is possible within the sections for at least one of the plurality of sections, and in the event that at least one of the shortest times exceeds a specified reference time, extends the specified time (refer, for example, to S33 in FIG. 11, and FIG. 12B). The control section makes the shortest time that exceeds the specified reference time, the specified time (refer, for example, to S33 in FIG. 11, and to FIG. 12B).

Figure 19:
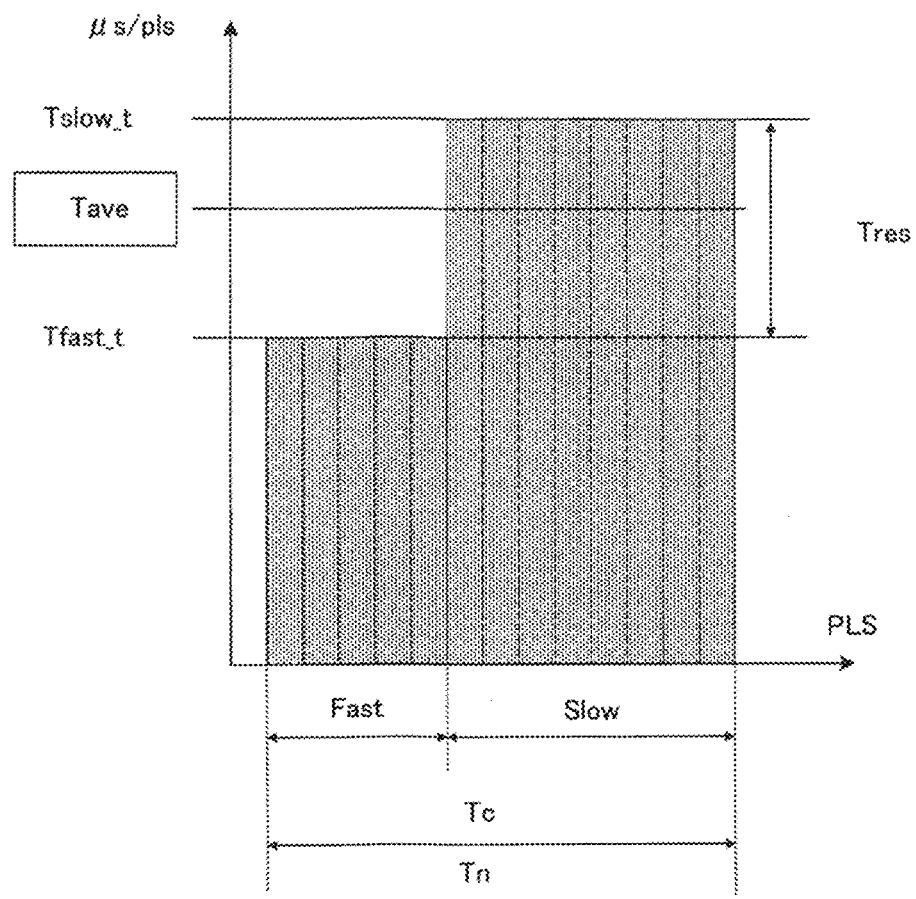
FIG. 19 is a drawing for describing average time for every one pulse, in the camera of one embodiment of the present invention.
Figure 22:
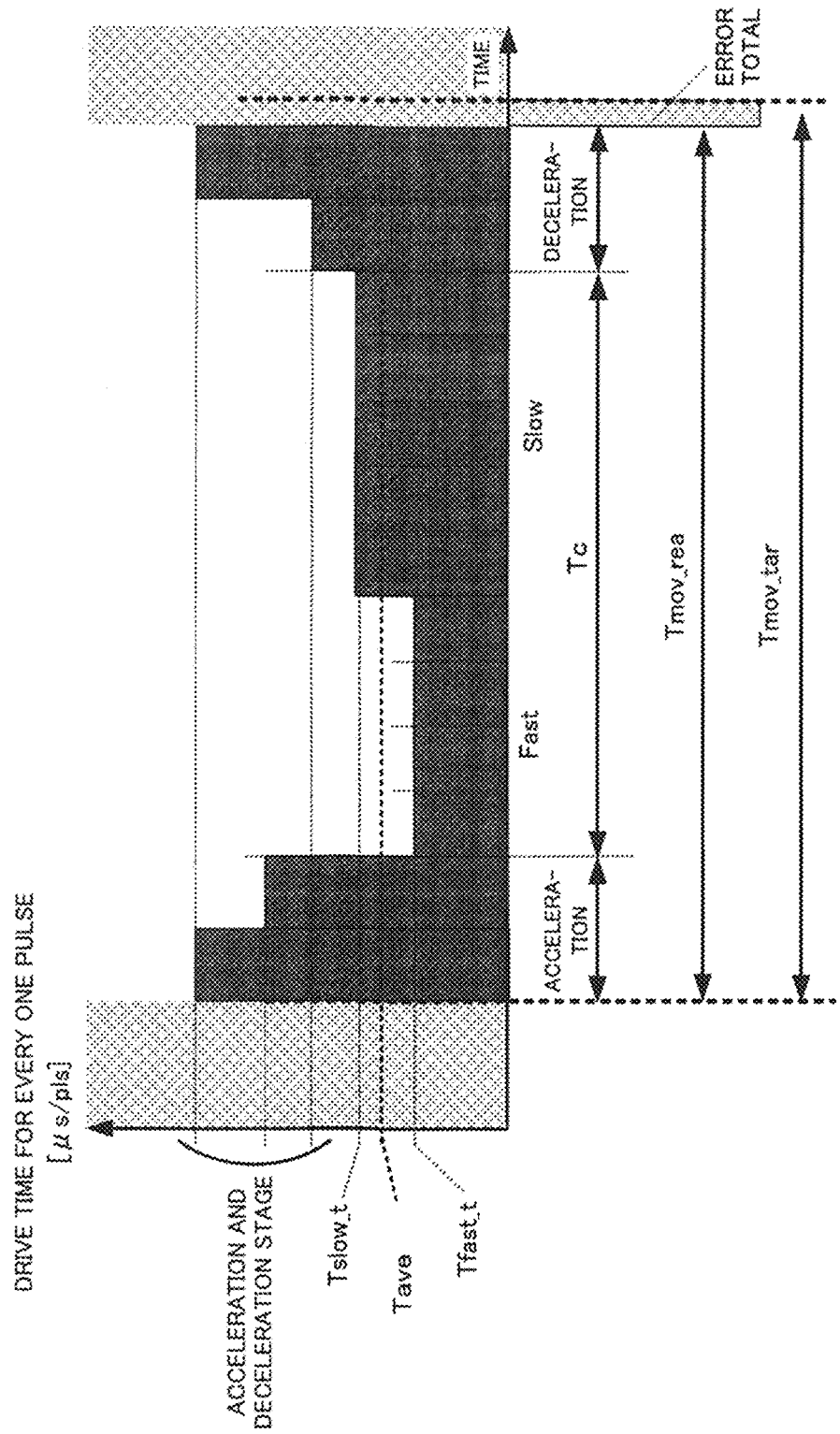
FIG. 22 is a drawing for describing that errors are reduced by performing speed division for a constant speed period, in the camera of one embodiment of the present invention.

There is also a period in which at least one of the first stepping motor, second stepping motor, and third stepping motor are driven at a constant speed, and the control section (processor) divides a period in which there is drive at a constant speed into a plurality of periods, in order to make a time, required to move the zoom lens, focus lens, and second zoom lens (or correction lens) through a specified section with a specified number of pulses, the specified time, and sets a plurality of drive times either side of an average time to drive pulses for the plurality of periods (refer, for example, to FIG. 19 and FIG. 22). In this embodiment, the third stepping motor drives the correction lens 254, but this is not limiting, and the third stepping motor may also drive the second zoom lens, with the control section controlling the third stepping motor. The control section (processor) also sets a drive time for drive pulses so that drive times, for driving the zoom lens and the focus lens concurrently in a specified section between respective specified positions, become the same (refer to FIG. 22).

The control section (processor) also sets a plurality of drive times either side of average drive time, so that there is a difference between control unit times (refer, for example, to FIG. 19). The control section (processor) sets one of the plurality of drive times either side of the average drive time to drive pulses for first periods that are continuous among the plurality of periods, and sets the other drive time to drive pulses for second periods that are continuous among the plurality of periods (refer to FIG. 19 and FIG. 22, for example). The control section (processor) sets one of the plurality of drive times either side of the average drive time to the drive pulses for first periods that are dispersed among the plurality of periods, and sets the other drive time to drive pulses for second periods that are dispersed among the plurality of periods (refer to FIG. 23, for example).

Shooting operation and live view operation using this camera will be described. First, the control microcomputer 101 inputs image data from the image sensor drive IC 110 to the image processing IC 102. The image processing IC 102 saves the image data that has been input to SDRAM 103, which is a temporary storage memory. It should be noted that the SDRAM 103 may also be used as a work area for image processing by the image processing IC 102. Also, the image processing IC 102 performs image processing to convert image data to JPEG data, and can save the image data after conversion in the storage media 131.

Next, the live view operation will be described. The image sensor 111 continuously exposes subject images at a rate of, for example, about 30 frames per second. The image sensor drive IC 110 outputs image data that has been photoelectrically converted by the image sensor 111 to the image processing IC 102, and the image processing IC 102 converts the image data to a video signal and outputs to the liquid crystal monitor 140. The liquid crystal monitor 140 displays a movie image of the subject. This type of display is called "live view", and is common knowledge. It should be noted that in performing "live view display" in the camera based on image data the user may select live view mode by operating a mode change switch within the operation members 150. It should be noted that live view is sometimes abbreviated to "LV".

At the time of a live view (LV) operation, light flux that has passed through the zoom lens 250, focus lens 253, and correction lens 254 within the lens unit 200 is normally guided to the image sensor 111. Since photoelectric conversion output of the image sensor 111 is output to the image sensor drive IC 110, photometric processing in accordance with subject brightness and ranging processing in accordance with subject distance may be performed by the image processing IC 102 based on image data output from the image sensor drive IC 110. Photometric processing, ranging, and automatic focus processing, that are performed by the image processing IC 102 and the control microcomputer 101 based on image data that has been subjected to photoelectric conversion by the image sensor 111 and output from the image sensor drive IC 110, are respectively called "LV photometry", and "LVAF".

Figure 2:
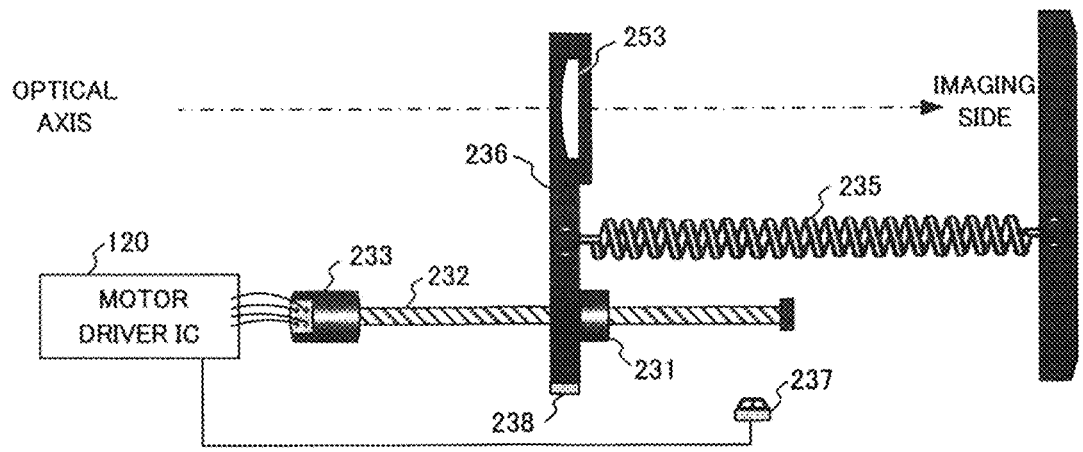
FIG. 2 is a drawing showing the structure of a lens drive mechanism of a camera of one embodiment of the present invention.

Next, the lens drive mechanisms A205, B230, and C240 will be described using FIG. 2. In FIG. 2 a drive mechanism for driving the focus lens 253 is shown, but the lens drive mechanism A205 for driving the zoom lens 250, and the lens drive mechanism C240 for driving the correction lens 254, also have a similar structure.

The focus lens 253 is held in a frame 236, a hole is provided in a lower part of this frame 236, and a screw 232 is passed through this hole. The screw 232 is arranged along the optical axis direction of the focus lens 253. An imaging side of a lower part of the frame 236 is urged towards the imaging side by a spring 235, and a nut 231 is fastened to the screw 232. As a result, the frame 236 holding the focus lens 253 is positioned in contact with the nut 231 by the urging force of the spring 235.

A rotating shaft of a stepping motor 233 is fixed to a body side end section of the screw 232. As a result, if the rotating shaft of the stepping motor 233 is rotated, the screw 232 rotated, and position of the nut 231 also moves. If position of the nut 231 moves, then the frame 236 that holds the focus lens 253 also moves together with the nut in the optical axis direction.

A bottom surface of the previously described frame 236 constitutes a reflecting surface 238. Also, a position sensor 237 is arranged within the movement range of the frame 236. The position sensor 237 and the stepping motor 233 are connected to the motor drive IC 120. The position sensor 237 has a light emitting section and a light receiving section, and if incident light from the light emitting section is reflected by the reflecting surface 238, it is possible to detect using the light receiving section.

Figure 3:
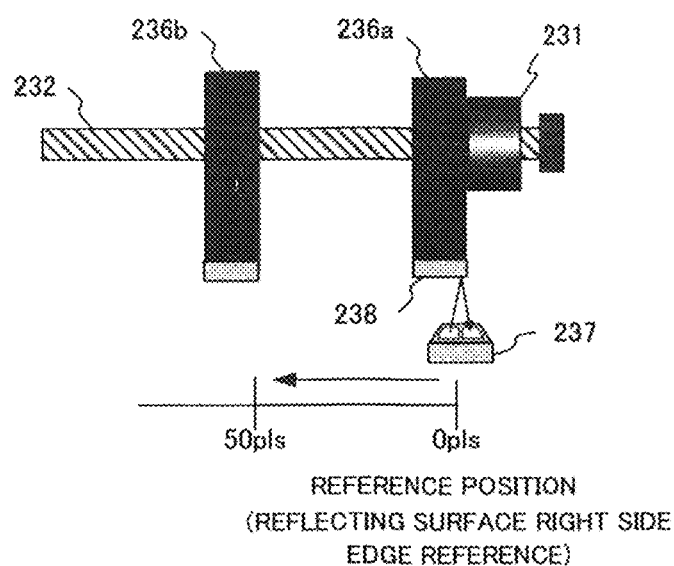
FIG. 3 is a drawing showing a structure for detecting lens position, of a camera of one embodiment of the present invention.

Detection of position of the focus lens will be described using FIG. 3. In FIG. 3, a frame 236a represents the frame 236 at a reference position. If the frame 236 reaches the reference position, reflected light from the reflecting surface 238 is received by the position sensor 237. Since the reflecting surface 238 has a fixed surface area, edges occur in a signal based on reflected light. In this embodiment, a right side edge is made a reference. A point in time where the position sensor 237 detects the right side edge of a signal is made a reference position, and position of the focus lens 253 is managed using a number of pulses from the reference position. For example, in the example shown in FIG. 3, if there is 50 pulse drive from the reference position, the frame 236 that holds the focus lens 253 is moved to position 236b. At this time the control microcomputer 101 performs position management with the focus lens position being at a position of "50 pulses", and "a number of pulses" that have been driven from the reference position is called an "absolute pulse value (units are expressed as pls)".

It is possible to determine lens position for the zoom lens 250 and the correction lens 254 using a similar method.

Next, operation for lens drive will be described using the flowchart shown in FIG. 4. This flowchart (the same also applies to the flowcharts shown in FIG. 11 and FIG. 18) is realized by the CPU within the control microcomputer 101 controlling each section within the camera 1 in accordance with programs that have been stored in memory.

Figure 4:
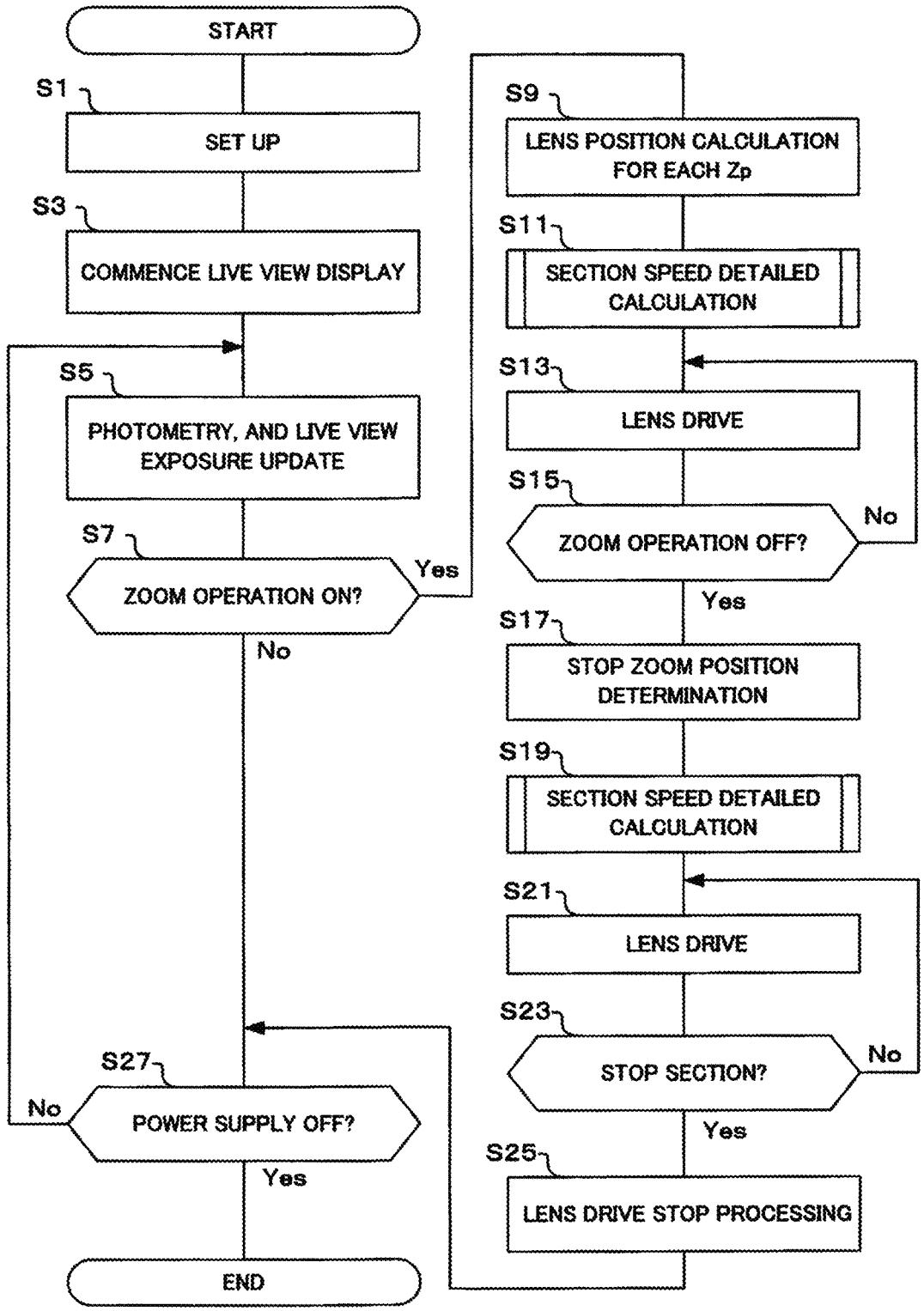
FIG. 4 is a flowchart showing lens drive operation, in the camera of one embodiment of the present invention.

If the flowchart shown in FIG. 4 commences operation as a result of the power supply being turned on, first, setup is performed (S1). If the power supply is turned on, the control microcomputer 101 controls the lens unit 200 so as to enter a state where live view operation it is possible. This is in order to first of all manage lens position. The zoom lens 250, focus lens 253, and correction lens 254 are driven to reference lens positions. Specifically, all lenses are driven to the imaging side until reflected light from the reflecting surface 238 is detected by the position sensor 237 (refer to FIG. 2 and FIG. 3). After that, the lenses are driven to a predetermined zoom position. In this embodiment zoom position is divided into 100 steps, and position at the time of setup is made a third position, among the zoom positions at 100 steps (refer to FIG. 5). Also, the shutter 252 is put into an open state, and the aperture 251 is subjected to the previously described "reset drive" and put in the wide-open state.

If set up has been performed, next the previously described "live view display" is commenced (S3). Next, the previously described "LV photometry" and live view exposure update are performed (S5). Based on results of "LV photometry" the image processing IC 102 changes amplification factor (ISO sensitivity) for the image sensor drive IC 110, and the control microcomputer 101 changes aperture value of the aperture 251, so as to achieve appropriate exposure for live view. Here, the previously described "LVAF" is performed, and the focus lens 253 is moved so as to focus on a subject.

Next, it is determined whether or not the zoom operation switch has been turned on (S7). Here, the control microcomputer 101 determines whether or not the zoom operation switch within the operation members 150 has been turned on to either the telephoto side or the wide-angle side.

If the result of determination in step S7 is that the zoom operation switch is on, lens positions for each zoom position (Zp) are calculated (S9). In this step, the control microcomputer 101 calculates position of each lens, for each zoom position, from the current position to the telephoto end (or the wide-angle end). Details of this lens position calculation will be described later using FIG. 5 to FIG. 7.

If lens positions for each Zp have been calculated, next, detailed calculation of section speed is performed (S11). As was described previously, in step S9 lens positions were calculated for each Zp. In this step, lens drive speed is calculated between each Zp and the next Zp, specifically, for each section. Drive speed of the lens is determined by times of pulses that are applied to the stepping motor. Speed becomes lower as drive time for every one pulse becomes longer. When calculating speed for each section, section speed is adjusted so that the zoom lens 250, focus lens 253, and correction lens 254 arrive at each Zp at substantially the same time (refer to FIG. 8). In this step, detailed section speed is calculated for all sections (in this embodiment, 100 sections). Detailed calculation of section speed will be described later using FIG. 8 to FIG. 11.

If detailed calculation of section speed has been performed, next, lens drive is performed (S13). Here, the control microcomputer 101 drives the zoom lens 250, focus lens 253, and correction lens 254 using the motor drive IC 120, based on section speed that was calculated in step S11. As was described previously, since section speeds for all sections are calculated in step S11, the control microcomputer 101 controls drive of the zoom lens 250, focus lens 253, and correction lens 254 in accordance with a section in which position of the zoom lens 250 belongs.

If lens drive has been performed, it is determined whether or not the zoom operation switch has been turned off (S15). Here, the control microcomputer 101 determines whether or not the zoom operation switch within the operation members 150 has been turned off. If the result of this determination is that the zoom operation switch is on, processing returns to step S13, and the control microcomputer 101 continues drive of the zoom lens 250, focus lens 253, and correction lens 254.

If the result of determination in step S15 is that the zoom operation switch is off, a stop zoom position is determined (S17). The control microcomputer 101 determines a zoom position that can be stopped at, close to the current position.

A position Zp that is closest to the current position, among the zoom stoppable positions Zp that have been determined in advance taking into consideration ease of use of the camera, and that is in the zoom drive direction, is determined. For example, stoppable zoom positions Zp are determined in advance as multiples of 3, except at the telephoto end. That is, if Zp0, 3, 6, 9, . . . , 93, 96, 100, are made stop positions, then in a case where Zp, at the point in time where the zoom operation has been turned off, during zoom from Zp3 in the telephoto direction, becomes Zp16, stop position is determined to be Zp18. Also, in a case where the zoom operation is not turned off, even if Zp96 is reached, at that point in time ZP100 is determined to be the stop position.

If stop zoom position has been determined, detailed calculation of section speed is performed (S19). Here, detailed calculation of section speed for a section immediately before a zoom position to be stopped at is recalculated, in order to stop at the stop zoom position that was determined in step S17. A section in which speed is recalculated here is called a "stop section". Detailed calculation of section speed will be described later using FIG. 8 to FIG. 11.

Next, lens drive is performed until the stop section is reached (S21). Here, the control microcomputer 101 drives the zoom lens 250, focus lens 253, and correction lens 254 using the motor drive IC 120, based on section speed that was calculated in step S19.

It is next determined whether or not it is a stop section (S23). If the result of determination in step S23 is that the stop section has been reached, lens drive stop processing is performed (S25). Here, the control microcomputer 101 executes processing in order to stop drive of the zoom lens 250, focus lens 253, and correction lens 254 by the motor drive IC 120. If the previously described "stop section" that was determined in step S19 has been reached, excitation of the stepping motors is turned off after last one pulse drive for stop section. Generally, the stepping motors require excitation for a predetermined specified time before and after drive, but in this embodiment this has been left out of the description. With all photographing lenses in a stopped state, lens drive stop processing is completed.

If the lens stop processing of step S25 has been executed, or if the result of determination in step S7 is that the zoom operation switch is off, it is determined whether or not the power supply switch is off (S27). Here, the control microcomputer 101 determines whether or not the power supply switch within the operation members 150 has been turned off. If the result of this determination is that the power supply switch is on, processing returns to step S5, and the previously described operation is executed. On the other hand, if the power supply switch is off, the operation of this flow is terminated.

In this way, in the flowchart shown in FIG. 4, if the zoom operation switch is turned on a position of each lens for each zoom position (each Zp) is calculated for every lens (S9). Then, drive speed is calculated for between one zoom position and another zoom position (between each section) for the zoom lens 250, focus lens 253, and correction lens 254, respectively (S11). If respective drive speeds have been calculated, drive for each lens is controlled based on the results of this calculation (S13).

Next, lens position for each zoom position (Zp) in the description of step S9 (refer to FIG. 4), and section in the description of step S11, will be described using FIG. 5 to FIG. 7. Positions of the zoom lens 250 are prepared in advance in a relationship table for lens absolute position and each Zp, in accordance with Zp, and stored in memory within the control microcomputer 101. With this embodiment, zoom positions Zp0 to Zp100 are provided, between the wide-angle end and the telephoto end, as shown in FIG. 5. If positions of the zoom lens are shown as absolute pulse values, they are a000 to a100.

Position of the focus lens 253 is determined using Zp, and position where focus is achieved on the subject. Optical subject distance (distance from the lens to the subject position) is calculated from Zp (corresponding to focal length), current focus lens position, and imaging position. A method of calculating subject distance has been omitted as it is well known. With this embodiment description will be given with an example where a subject distance that has been calculated is made 60 cm. Lens position at this time in b003. Position of the correction lens 254 is current position c003.

Calculation of lens position for each Zp in step S9 involves reading out and using current zoom position (Zp3) that has been stored in memory within the control microcomputer 101, for the zoom lens 250. Positions for the focus lens 253 and the correction lens 254 are also similarly read out from memory and used. Other lens positions b000 to b002, b004 to b100, and c000 to c002, c004 to c100, are calculated by the control microcomputer 101.

Focus lens position where there is focus at the previously described subject distance (60 cm) is calculated for each of the other zoom positions Zp. A method of calculating focus lens position from subject distance is well-known, and so detailed description has been omitted. In FIG. 5, if shown as absolute pulse values, these positions become b000 to b002, and b004 to b100. Positions of the correction lens 254 corresponding to each of other focal length positions (zoom positions Zp) are made values resulting from adding or subtracting a "predetermined fixed amount corresponding to subject distance" to or from "predetermined positions (absolute pulse value)" for every Zp. For example, if subject distance is less than 30 cm, one pulse is added, if subject distance is then greater than or equal to 30 cm, further addition is not performed. If shown as absolute pulse value, position will become c000 to c002, and c004 to c100. In step S9, all lens positions for each Zp are determined.

FIG. 6 shows a relationship between zoom position Zp and section. As was described previously, a total of 101 zoom positions Zp, namely zoom positions Zp0 to Zp100, are provided between the wide-angle end and the telephoto end, and section 0 to section 99 are provided between these two positions Zp.

FIG. 7 shows section pulse value ([pls]) for each lens. Respective section pulse values are differences between absolute pulse positions ([pls]) for adjacent zoom positions Zp. For example, section pulse value for section 0 of the zoom lens 250 is a difference value between absolute pulse value a000 for zoom position Zp0 and absolute pulse value a001 for zoom position Zp1. It is possible to obtain section pulse values ad000 to ad099 from section 0 to section 99 by obtaining difference values for other sections. It is also possible to similarly obtain section pulse values bd000 to bd099 for the focus lens 253 from section 0 to section 99. For the focus lens 253, section pulse value changes significantly with subject distance. It is also possible to similarly obtain section pulse values cd000 to cd099 for the correction lens 254 from section 0 to section 99.

Figure 8:
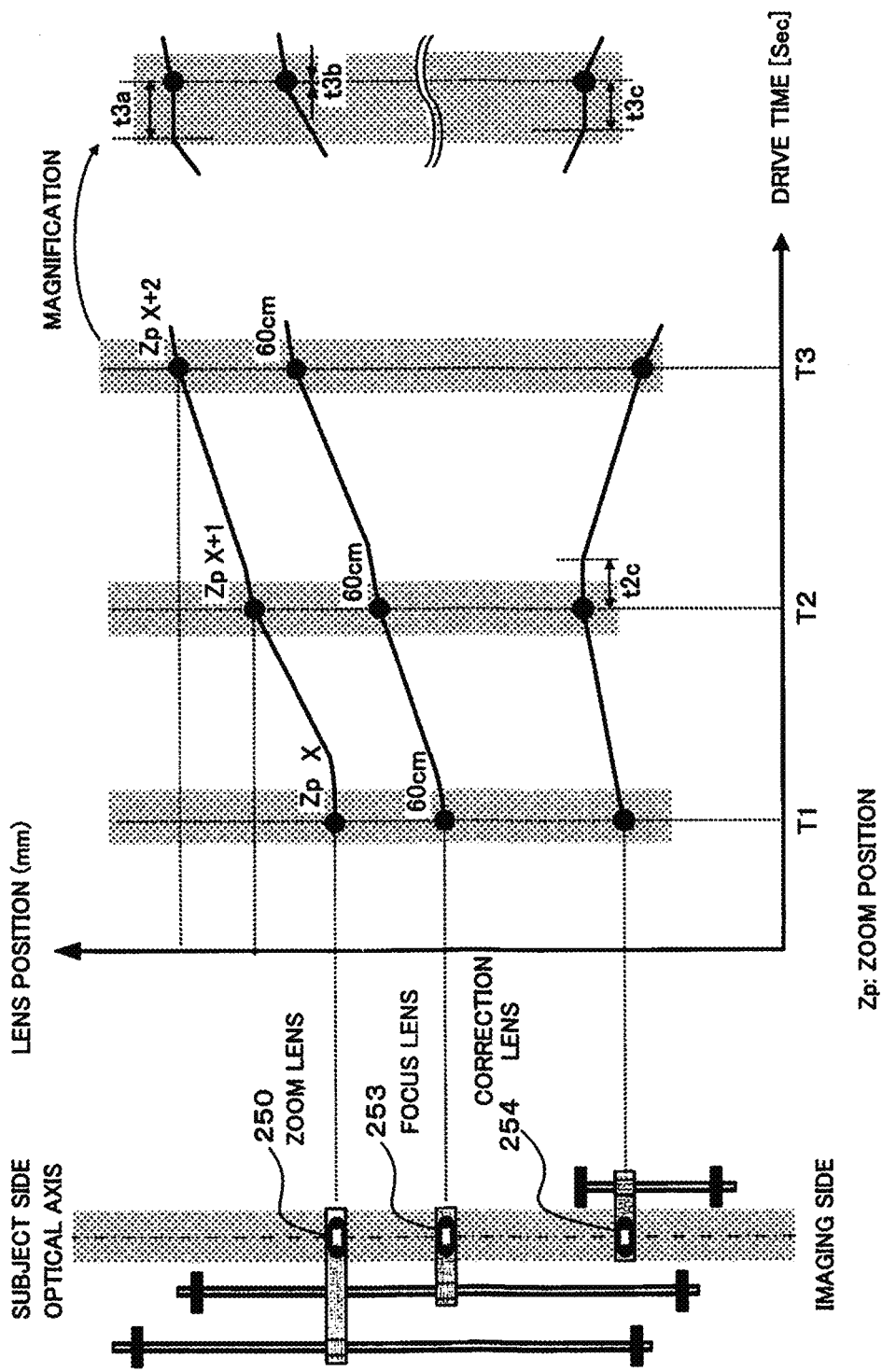
FIG. 8 is a drawing schematically showing position of each lens, for respective zoom positions, in the camera of one embodiment of the present invention.

Next, coordinated drive of each lens will be described using FIG. 8. FIG. 8 shows change over time of each lens position in a case where zooming (angle of view change) has been performed, with an example of zoom position Zp=X, and focus position immediately before commencement of zoom being focused at a subject distance of 60 cm. In FIG.

8, the vertical axis shows positions of the zoom lens 250, focus lens 253, and correction lens 254, and the horizontal axis shows flow of time.

In FIG. 8, at time T1 zoom position Zp of the zoom lens 250 is at position X, and the focus lens 253 at this time is at a position focused at subject distance of 60 cm. Also, the correction lens 254 is driven to a position where optical aberration is eliminated. Once time T2 is reached, zoom position Zp of the zoom lens 250 is position X+1, and the focus lens 253 at this time is also driven to a position to focus at a subject distance of 60 cm. Once time T3 is reached, zoom position Zp of the zoom lens 250 is position X+2, and the focus lens 253 at this time is also driven to a position to focus at a subject distance of 60 cm.

Also, the correction lens 254 is driven to a position where it is possible to eliminate optical aberration, in accordance with change in the positions of the zoom lens 250 and the focus lens 253. In FIG. 8, an example is shown in which drive direction of the correction lens 254 is reversed. The stepping motor is stopped for a specified time before reversal, in order to suppress sudden load fluctuations at the time of reversal. Also, while being stopped for the specified time, the control microcomputer 101 instructs drive in the opposite direction to the motor drive IC 120. In FIG. 8, the correction lens 254 is driven in the opposite direction after being stopped for time t2c at the time of reversal in drive direction. With this embodiment, as will be described later, stop time at the time of reversal is also taken into consideration, in order to prevent the occurrence of waiting time for each of the plurality of lenses.

Each lens is subjected to drive control so as to be at lens positions (target positions) that were respectively calculated in advance, at the same specified time, for zoom positions ZpX, ZpX+1, ZpX+2, etc. This type of drive control is called coordinated drive. Problems that arise when there is no coordinated drive will be described. As shown in the magnification of time T3 in FIG. 8, for zoom position Zp etc., if there is offset in the time at which respective target positions are reached, then for time t3 waiting time will arise in order to await the arrival of other lenses at their respective appropriate positions. With the example shown in the magnification of FIG. 8, with the zoom lens 250 there is a waiting time of t3a, with the focus lens 253 there is a waiting time of t3b=0, and with the correction lens 254 there is a waiting time of t3c. If the waiting times such as in the magnification of FIG. 8 arise, then in a period of t3a position of the focus lens 253 or position of the correction lens 254 does not reach the target position, and so image quality of an image (live view image or movie image) that is taken in the period t3A is degraded. Accordingly, in order to improve image quality coordinated drive is preferably performed in order for each lens to arrive at each target position at the same specified time, so that the waiting times t3a and t3c shown in the magnification of FIG. 8 do not occur at respective zoom positions Zp. In this embodiment, in step S11 (refer to FIG. 4) drive speed of each lens is adjusted and coordinated drive performed so that waiting times do not occur.

There are design rules for changing speed when a stepping motor is accelerating or decelerating, in order to suppress the occurrence of step-out and drive noise. For example, it is known that for a stepping motor, if a self-start region and a slew region are ignored, the possibility of step-out occurring is high. As a method for changing motor drive speed at the time of acceleration and deceleration based on predetermined rules, with this embodiment speeds (drive time for every one pulse) called "acceleration and deceleration stages" are provided. A rule for speed change is driving with pulses of a "number of pulses needed for acceleration and deceleration" at a speed (drive time for every one pulse) of the "acceleration and deceleration stages", in a case of performing speed change across "acceleration and deceleration stages". "acceleration and deceleration stages" and "number of pulses needed for acceleration and deceleration" are determined in advance by mechanism design, from stepping motor characteristics, load placed on a stepping motor, and the intended use of the motor (low-noise priority, or speed priority) etc.

Next, differences in control using "number of pulses needed for acceleration and deceleration" for a case where there are acceleration and deceleration stages, will be described using FIG. 9 and FIG. 10. The example shown in FIG. 9 and FIG. 10 has a plurality of acceleration and deceleration stages, being an acceleration and deceleration stage 1 and an acceleration and deceleration stage 2, for control to set drive time for every one pulse.

Figure 9:
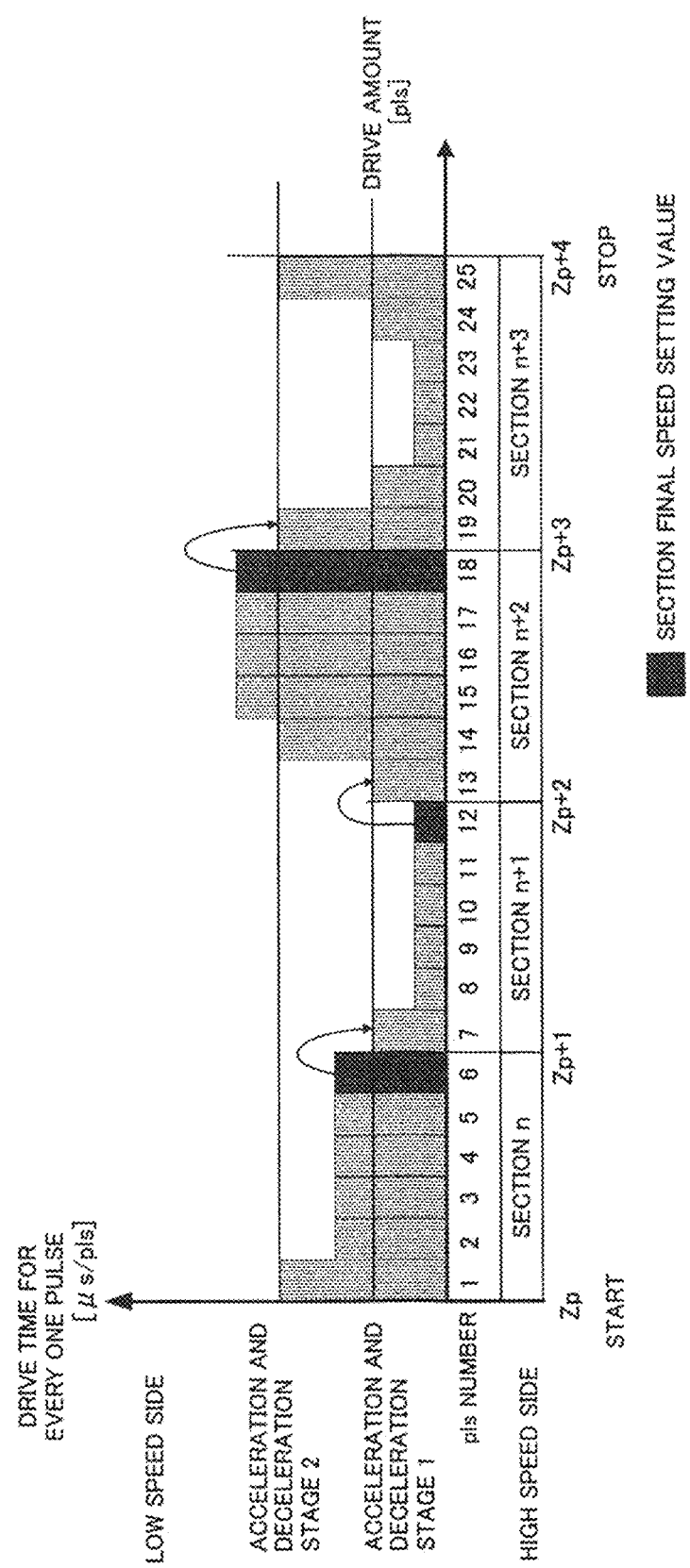
FIG. 9 is a drawing showing an example where an acceleration and deceleration stage of a stepping motor is 1 pulse, in the camera of one embodiment of the present invention.

FIG. 9 shows control in a case where "number of pulses needed for acceleration and deceleration" when switching speed is one pulse. With the example shown in FIG. 9, there are pls numbers 1 to 6 within section n indicating order of pulses for driving the stepping motor, and there are pls numbers 7 to 12 within the section n+1 (pls 13 to 25 have the same meaning and so their description has been omitted).

Section n+1 in FIG. 9 has an average speed for pls numbers 7 to 12 that is higher speed than speed of pls number 6 in section n, and shows a case where drive is performed at a higher speed over acceleration and deceleration stage 1. When driving the stepping motor by applying an initial pulse (pls number 7) for section n+1 from the final pulse of section n (pls number 6), acceleration and deceleration stages are crossed, and the stepping motor is driven with one pulse for pls number 7 for a "drive time for every one pulse" for "acceleration and deceleration stage 1". The remaining pulses (pls numbers 8 to 12) are driven at a constant peed that is faster than the speed of "acceleration and deceleration stage 1".

Section n+2 is a case where drive is at a slower speed than the speed of "acceleration and deceleration stage 2", with drive of one pulse at a time for pls numbers 13 and 14 respectively as acceleration and deceleration stage 1 and acceleration and deceleration stage 2. Section n+3 shows a case of control immediately before stopping. Although speed is momentarily fast, at the final pulse of section n+3 (pls number 25), speed is made that of "acceleration and deceleration stage 2", which is the slowest acceleration and deceleration stage. This is an example of control that can stop after pls number 25 (since there are no acceleration and deceleration stages spanning from acceleration and deceleration stage 2 until stop, at that point).

In this way it is shown that there is control at the speed of acceleration and deceleration stage 1 or acceleration and deceleration stage 2 (drive time for every one pulse) with only one pulse every time acceleration and deceleration stage 1 or acceleration and deceleration stage 2 is crossed. The same also applies to pls numbers 14, 19, and 20 in FIG. 9.

Figure 10:
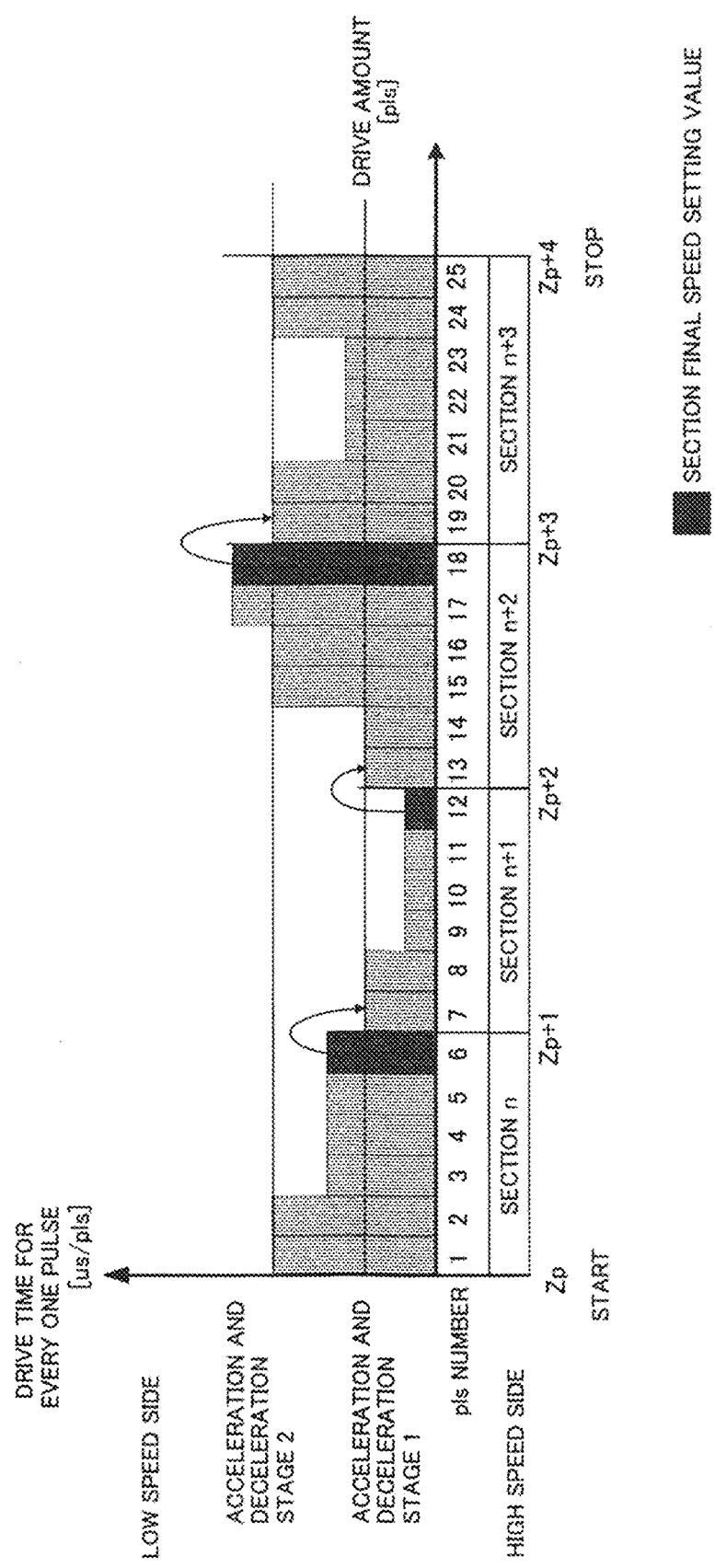
FIG. 10 is a drawing showing an example where an acceleration and deceleration stage of a stepping motor is 2 pulses, in the camera of one embodiment of the present invention.

FIG. 10 shows control in a case where "number of pulses needed for acceleration and deceleration" when switching speed is two pulses. With the example shown in FIG. 10, compared to the case of FIG. 9, it is shown that a number of pulses for drive in acceleration and deceleration stage 1 or acceleration and deceleration stage 2 becomes two pulses (pls numbers 7 and 8). The same also applies to pls numbers 13 and 14, and 19 and 20, in FIG. 10.

Next, operation of detailed calculation of section speed in steps S11 and S19 (refer to FIG. 4) will be described using the flowchart shown in FIG. 11. This flowchart shows calculation of "drive time for every one pulse" for respective sections of all the sections (section 0 to section 99 (refer to FIG. 6)).

If the flow for detailed calculation of section speed shown in FIG. 11 is commenced, first a shortest time for which control is possible is calculated (S31). The zoom lens 250, focus lens 253, and correction lens 254 have different shortest times for which a number of pulses for each section can be driven. As was described using FIG. 8, for zoom position Zp of each section, each lens reaching a specified position at the same time is desirable from the viewpoint of ensuring image quality. In order to calculate drive time for every one pulse for each lens, in this step a shortest time for which control is possible is calculated. Calculation of the shortest time will be described later using FIG. 15 to FIG. 17C.

If the shortest time for which control is possible has been calculated, next, time for the final section is calculated (S33). In this step, a section time that has been set for driving in a section is read out from a table (referred to the "section time_table value" of FIG. 14, which will be described later). And the final section time is calculated based on shortest times for all lenses that were acquired in step S31. In a case where a particular lens has been reversed, a shortest time value that has had a reverse stop time added becomes a longest of the shortest times for all lenses (including reverse time addition). And in a case where the shortest time value is longer than a "section time", the final section time is made the "longest of shortest times for all lenses (including reverse time addition)".

If the final section time has been calculated, next, speed setting parameters for the section are determined from the final section time and number of pulses (S35). Here, the control microcomputer 101 determines a combination of lowest limit number of acceleration and deceleration stages that can control within a section time, using the final section time that has been calculated in step S33, and the number of pulses. Specifically, acceleration and deceleration stages are increased from 0, and the smallest number of acceleration and deceleration stages that fall within the final section time is obtained. After having determined speed setting parameters for the acceleration and deceleration stages, speed setting parameters for a constant speed period are obtained. Details of the setting parameters will be described later using FIG. 17A to FIG. 17C.

Specifically, in this step, as speed setting parameters,
(1) number of pulses for an acceleration and deceleration period,
(2) time for an acceleration and deceleration period,
(3) number of constant speed period pulses, and
(4) time of a constant speed period, are determined.

If speed setting parameters for a section have been determined, next, speed division calculation for a constant speed period is performed (S37). As was described previously, in step S35 speed setting parameters for a constant speed period are calculated. In digital control that is performed by the motor drive IC 120 and the control microcomputer 101, a minimum unit exists in a signal that can be generated, due to original vibration frequency and internal circuit limitations. Generally, these units are expressed using terms such as seconds/LSB, or seconds/bit. And in digital control, since control is only possible at an integral multiple of the minimum unit, for a time that has been calculated, it is a fact that errors will arise in time that has actually been controlled. This type of error is called quantization error. This minimum unit is called "control unit time". In order to suppress control errors for "section time", in this step S37 two drive times (integral number of the control unit time) that are closest to a constant speed that was calculated in step S35 are selected, as will be described later. And a number of times that drive will be performed for the respective drive times is calculated, so as to minimize errors. Details of this speed division calculation for a constant speed period will be described later using the flowchart shown in FIG. 18.

If speed division for a constant speed period has been calculated, next an order for speeds that will be driven are determined (S39). When acceleration and deceleration stages are crossed, based on restrictions for driving at the speed of the acceleration and deceleration stages, in a case of driving faster than the final pulse of the previous section, drive is performed with a lower speed pulse. In a case of driving at a lower speed than the final pulse of the previous section, drive is performed with a higher speed pulse first. In a case of dividing speed in a constant speed period, then since drive time for every one pulse is divided into a first time and a second time, this order is also determined (refer to FIG. 23).

Next, a final "drive time for every one pulse" of the previous section is updated (S41). Here, if the control microcomputer 101 calculates details of section speed for section n, in FIG. 10, for example, "drive time for every one pulse" for the 6th pls of section n is stored in memory as final speed of the previous section. Next, at the time of calculating details of section speed for section n+1, it is determined whether or not to perform speed change with acceleration and deceleration stages being crossed, from the "drive time for every one pulse" for the final pulse of the previous section.

It is next determined whether or not calculation has been completed for all sections (S43). In the flow for detailed calculation of section speed, drive time (drive speed) for every respective pls is calculated for each section (refer to FIG. 6). In this step, it is determined whether or not detailed calculation has been completed for all sections from the telephoto end to the wide-angle end.

If the result of determination in step S43 is that calculation has not been completed for all sections, the next section is set (S45), and step S31 is returned to. If step S31 is returned to, section speed etc. is calculated using the previously described calculations, for the section that was set in step S45. On the other hand, if the result of determination in step S43 is that calculation of section speed etc. has been completed for all sections, the originating flow is returned to, and lens drive is executed.

In this way, in the flow for detailed calculation of section speed, shortest time for which control is possible is calculated for every lens (S31), and final section time (confirmed section time td) is calculated for each section (S33). Then, speed setting parameters for every section are calculated based on the final section time (confirmed section time td) that has been calculated, and number of pulses for driving a section (S35). Further, calculation is performed for speed control of a constant speed period so that it is possible for each lens to arrive at each zoom position at substantially the same time (S37).

Next, description will be given of the calculation of shortest time for which control is possible in step S31 and calculation of time of a final section in step S33, using FIG. 12A to FIG. 16. In each section, a maximum speed (maximum speed limit), that is determined by stepping motor characteristics and load imposed on the stepping motor, is determined for each section, as shown in FIG. 13A and FIG. 13B. This maximum speed is stored in memory within the control microcomputer 101.

In FIG. 13A, zoom lens maximum speed limits La0 to La99, focus lens maximum speed limits Lb0 to Lb99, and correction lens maximum speed limits Lc0 to Lc99, corresponding to each of the sections, section 0 to section 99, are stored. A table showing these maximum speed limits is stored in memory within the control microcomputer 101, as was described previously.

FIG. 13B shows maximum speed limits for low-temperature use. Maximum speed of a stepping motor also changes in accordance with environmental temperature. With the example shown in FIG. 13B, zoom lens maximum speed limits Lat0 to Lat99, focus lens maximum speed limits Lbt0 to Lbt99, and correction lens maximum speed limits Lct0 to Lct99 are shown. A temperature sensor is provided in the camera, temperature is measured, and in a case where temperature is lower than a specified temperature, the table shown in FIG. 13B may be switched to and readout performed from that table. It should be noted that tables may also differ in accordance with other parameters, not being limited to temperature. For example, with the focus lens 253, there may be a table for every subject distance.

"a number of pulses required for an acceleration and deceleration stage" is called "acceleration and deceleration stage unit pulses". FIG. 13C shows acceleration and deceleration stage unit pulses. As was shown in FIG. 9 and FIG. 10, with this embodiment speed control of the stepping motors is performed using acceleration and deceleration stage 1 and acceleration and deceleration stage 2. The example shown in FIG. 13C has unit pulses Las, Lbs and Lcs for the acceleration and deceleration stage 1 and acceleration and deceleration stage 2. With the example shown in FIG. 9 described previously, the acceleration and deceleration stage unit pulse is one pulse, and with the example that was shown in FIG. 10 the acceleration and deceleration stage unit pulse is two pulses.

FIG. 14 shows an example of a section time_table. Predetermined section times tt are made into a table for each section 0 to 99 in accordance with zoom speeds A to G, and stored in memory within the control microcomputer 101. FIG. 14 shows only a single table, but other zooms speeds may change depending on intended use and environment etc., and in that case a plurality of tables are prepared. Also, a plurality of table may be prepared in accordance with whether or not there are silent mode has been set, and temperature etc.

Next, calculation of shortest time for which control is possible, that is performed in step S31 in FIG. 11, will be described using FIG. 15 and FIG. 16. First, calculation of shortest time in a case where there is acceleration to a maximum speed within a section, will be described using FIG. 15. It should be noted that FIG. 15 is an example where "acceleration and deceleration stage unit pulse" is one pulse.

Figure 15:
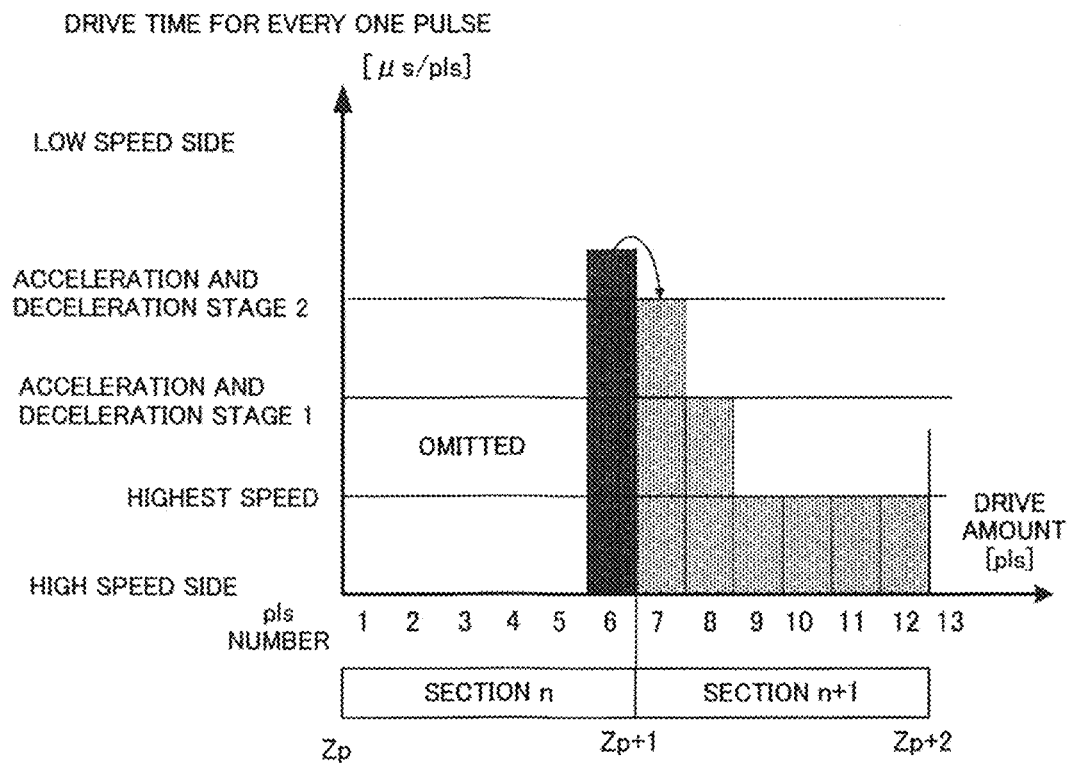
FIG. 15 is a drawing for describing calculation of shortest time, from an acceleration and deceleration stage to a fastest stage, in the camera of one embodiment of the present invention.

FIG. 15 shows a case where the 6th pls of section n is set to a lower speed (drive time per single pulse) than the acceleration and deceleration stage 2, and there is acceleration from this state to maximum speed in section n+1. A case is assumed where the 7th pls, which is the initial pls of section n+1, is set to acceleration and deceleration stage 2, the 8th pls is set to acceleration and deceleration stage 1, and 9th and subsequent pulses are set to maximum speed. In the graph shown in FIG. 15, area of the thinly hatched parts corresponds to time for section n+1. In a case where an acceleration and deceleration stage is contained within a section, drive time in an acceleration and deceleration stage for driving with a "acceleration and deceleration stage unit pulse" at the speed of all acceleration and deceleration stages is obtained. Next, a number of pulses used in all acceleration and deceleration stage is obtained. And "the total number of pulses used in all acceleration and deceleration stages" is subtracted from "the number of pulses of section n+1" to obtain a remaining "number of pulses" for section n+1. Then, time of a constant speed section portion in which the remaining "number of pulses" is made maximum speed, is obtained. The sum of time of the acceleration and deceleration stage and the time of a constant speed section portion is then the shortest time for section n+1. In a case where a number of pulses is small and not all acceleration and deceleration stages are spanned, calculation may be performed with only acceleration and deceleration stages that are spanned, and required number of pulses for those acceleration and deceleration stages.

Figure 16:
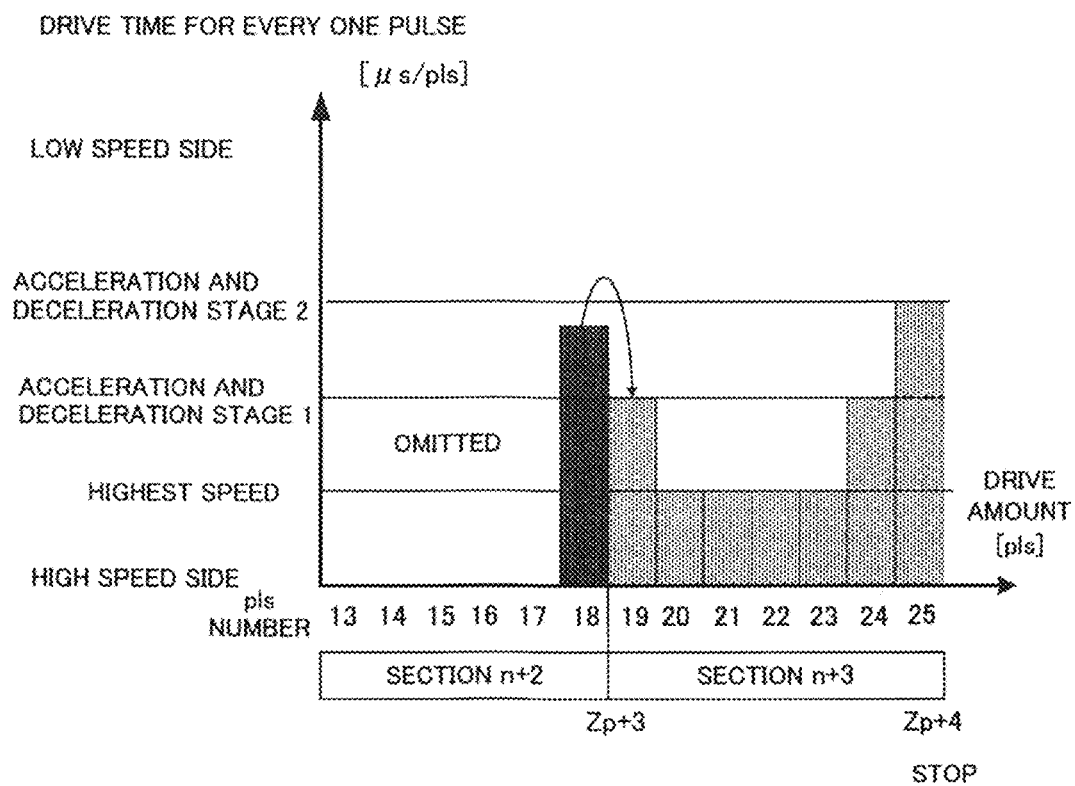
FIG. 16 is a drawing for describing the fact that an acceleration and deceleration stage is provided, and there is a stop at the shortest, in the camera of one embodiment of the present invention.

FIG. 16 shows a control example corresponding to calculation of shortest time for a case here the stepping motor is stopped, in step S31 in FIG. 11. It is possible to set a shortest time by first accelerating, then decelerating after reaching maximum speed, and then stopping. As shown in FIG. 16 in the 18th pls of section n+2, there is a drive speed between the acceleration and deceleration stage 1 and the acceleration and deceleration stage 2. And, there is acceleration to the acceleration and deceleration stage 1 at the 19th pls of section n+3, and acceleration to maximum speed in the 20th pls. Further, from the 21st pls to the 23rd pls maximum speed is maintained, there is deceleration to acceleration and deceleration stage 1 in the 24th pls. And there is deceleration to the acceleration and deceleration stage 2 in the 25th pls, followed by stop. In the graph shown in FIG. 16, area of the thinly hatched parts corresponds to shortest time for section n+3.

Next, description will be given for processing to calculate final section time, executed in step S33 of FIG. 11, based on FIG. 12A and FIG. 12B. The control microcomputer 101 determines whether or not a time required for drive of each section does not exceed section time for each section, and determines whether or not to extend the section time. For example, in a case where drive time of the zoom lens (ZM) 250, and times required to drive the focus lens (FCS) 253 and the correction lens (CORR) 254, do not exceed section time tt that has been stored in the section time_table, the section time is not extended as shown in FIG. 12A. Specifically, the section time tt is adopted as the final section time.

On the other hand, if drive time for any of the lenses exceeds the section time tt that has been stored in the section time_table, section time is extended. For example, with the example shown in FIG. 12B, drive time (shortest time) of the focus lens (FCS) 253 exceeds the section time tt that has been stored in the section time_table. In this case, there is an extension from section time tt to the time (shortest time) required in order to drive the focus lens (FCS) 253, and the other lenses (zoom lens (ZM) 250 and correction lens (CORR) 254) are also controlled to conform with the extended section time (confirmed section time td). It should be noted that in calculating the shortest time for each lens, in a case including lens reversal, calculation is performed by adding reverse stop time for reversing the lens (refer to the reverse time stop time in FIG. 12B, and the direction reversal stop time t2c in FIG. 8). The confirmed section time td shown in FIG. 12B corresponds to the final section time in step S33 (refer to FIG. 11).

Figure 17A:
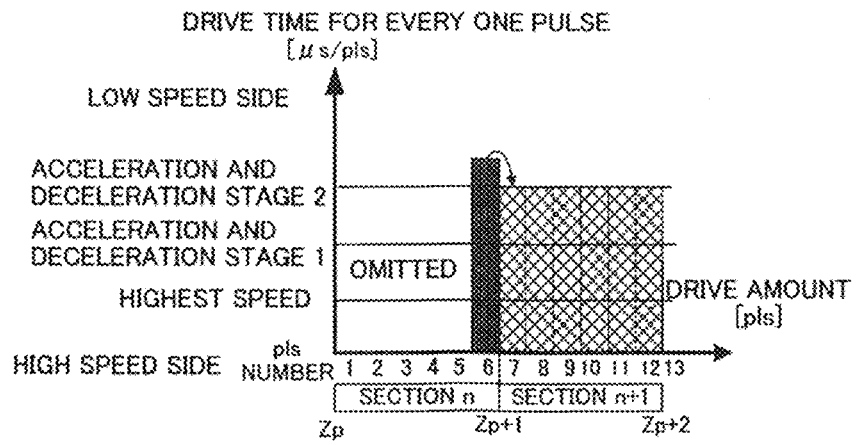
FIG. 17A to FIG. 17C are drawings for describing time required in accordance with number of acceleration stages, in the camera of one embodiment of the present invention.
Figure 17B:
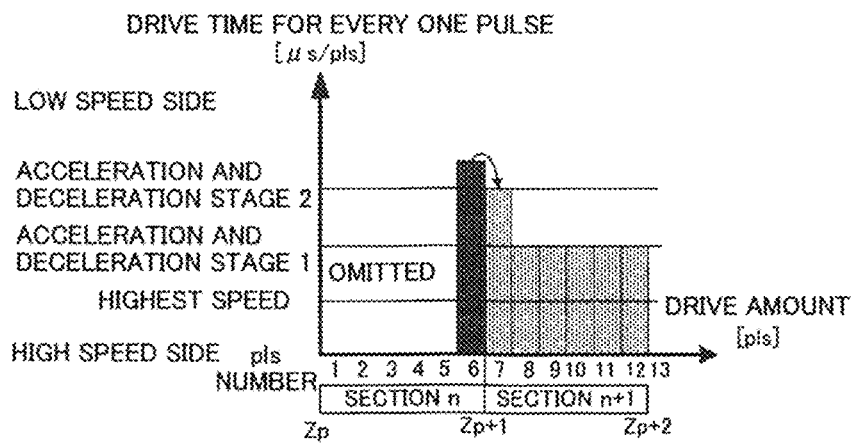
Figure 17C:
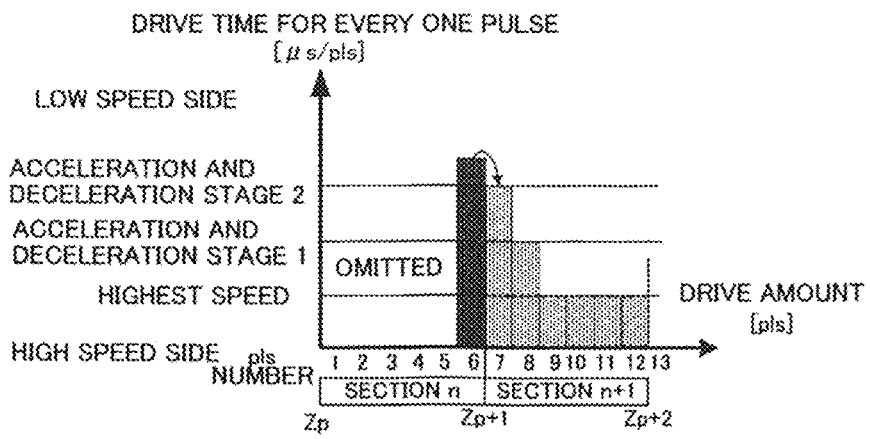

Next, using FIG. 17A to FIG. 17C, the processing for determination of speed parameters for each section (refer to S35 in FIG. 11) is described. First, a "number of acceleration and deceleration stages" that is the necessary minimum to be able to perform control in the "final section time" (the "confirmed section time td" (refer to FIG. 12B)), is obtained. It is possible to perform control in a shorter time as the number of acceleration and deceleration stages that are crossed increases in the acceleration direction. A "shortest times for which control is possible" corresponding to "a number of acceleration and deceleration stages that are crossed" are respectively obtained. And "necessary minimum number of acceleration and deceleration stages" is obtained by comparing these shortest times with the confirmed section time td. In FIG. 17A to FIG. 17C, the 6th pls, which is the final pls of section n, is set to a speed (drive time) more to the lower side than the acceleration and deceleration stage 2. Then, in FIG. 17A to FIG. 17C, settings for drive times for pls of the 8th pls, next to the 7th pulse which is the initial pls of section n+1, and after, are respectively different.

FIG. 17A shows a case where speed setting parameters are determined with acceleration and deceleration stages not being crossed. With the example shown in FIG. 17A, the 7th pls of section n+1 is set to the speed of the acceleration and deceleration stage 2, and from the 8th pls to the 12th pls are set to the speed of the acceleration and deceleration stage 2. In this case, speed setting parameters of section n+1 become (1) number of pulses of acceleration and deceleration period=0, (2) time of acceleration and deceleration period=0, (3) number of constant speed period pulses=6, and (4) time of constant speed period=confirmed section time td (in a case where lens reversal is included, =confirmed section time td-t2$c$).

FIG. 17B is an example where speed setting parameters are set due to the fact that one acceleration and deceleration stage has been crossed. With this example, the 7th pls of section n+1 is set to the speed of the acceleration and deceleration stage 2, and the 8th pls is set to the speed of the acceleration and deceleration stage 1. After that, from the 8th pls to the 12th pls are set to acceleration and deceleration stage 1. With this example, from setting of a speed more to the lower side than the acceleration and deceleration stage 2 in section n, setting of speed of the acceleration and deceleration stage 2 and setting of speed for acceleration and deceleration stage 1 is performed in section n+1. The acceleration and deceleration stage 2 is crossed, namely acceleration and deceleration stage is crossed once. In this case, speed setting parameters of section n+1 become (1) number of pulses of acceleration and deceleration period=1, (2) time of acceleration and deceleration period=ta, (3) number of constant speed period pulses=5, and (4) time of constant speed period=confirmed section time td-ta (in a case where lens reversal is included, =confirmed section time td-t2$c$-ta). It should be noted that time ta of the acceleration and deceleration period is drive time (speed) of the acceleration and deceleration stage 2 corresponding to the 7th pls, which is the initial pls of section n+1, shown in FIG. 17B.

FIG. 17C is an example where speed setting parameters are set due to the fact that two acceleration and deceleration stages have been crossed. With this example, with the 7th pls of section n+1 there is setting to the speed of the acceleration and deceleration stage 2, in the 8th pls there is setting to the speed of the acceleration and deceleration stage 1, and in the 9th pls there is setting to the maximum speed. After that, the maximum speed is set from the 9th pls to the 12th pls. With this example, from setting of a speed more to the lower side than the acceleration and deceleration stage 2 in section n, setting of speed of the acceleration and deceleration stage 2 and setting of speed for acceleration and deceleration stage 1 is performed in section n+1. And further, there is setting to the maximum speed. The acceleration and deceleration stage 1 and acceleration stage 2 are crossed, namely acceleration and deceleration stages are crossed twice. In this case, speed setting parameters of section n+1 become (1) number of pulses of acceleration and deceleration period=2, (2) time of acceleration and deceleration period=ta, (3) number of constant speed period pulses=4, and (4) time of constant speed period=confirmed section time td-ta (in a case where lens reversal is included, =confirmed section time td-t2$c$-ta). It should be noted that time ta of the acceleration and deceleration period is a sum of drive time (speed) of the acceleration and deceleration stage 2 corresponding to the 7th pls, which is the initial pls of section n+1. And drive time (speed) of acceleration and deceleration stage 1 corresponding to the 8th pls, shown in FIG. 17C.

Section time of section n+1 in FIG. 17A to FIG. 17C becomes a sum of areas of the bar graph within respective sections n+1 (shown by portions that are lightly hatched). If section times for section n+1 in FIG. 17A to FIG. 17C are respectively made time A, time B, and time C, then as will be clear from FIG. 17A to FIG. 17C, a relationship of time A>time B>time C is established. If the time is short, it means that with shorter time faster drive is possible. When determining speed setting parameters for a section in step S35, final drive time that has been calculated in step S33 (confirmed section time td) is sequentially compared with time A to time C. If there is a stop time t2$c$ for direction reversal stop, as shown in FIG. 8, the "confirmed section time td" is sequentially compared with "time A+t2$c$", "time B+t2$c$", and "time C+t2$c$". With a condition that time A to time C are the same as the final section time, or a shorter time than the final section time, control is possible within the "final section time". It is determined that control is possible, and control meets conditions that there is a minimum number of uses of acceleration and deceleration stages. For example, if times are in a relationship such that time A>time B>"final section time" >time C, then time C is adopted. In a case where there is a stop time t2$c$ for direction reversal stop, as shown in FIG. 8, time C is adopted when times are in a relationship of time A+t2$c$>time B+t2$c$>"final section time">time C+t2$c$. In a case where time C is adopted, it is a case where two acceleration and deceleration stages are used. In this case, two acceleration and deceleration stages are used, and after that a constant speed is set (in the case of FIG. 17C, Pls numbers 9 to 12).

If "number of acceleration and deceleration stages used in a section" has been determined in this way, "number of pulses of an acceleration and deceleration stage", "time of acceleration and deceleration period", and "number of constant speed period pulses" are calculated from "unit pulses for acceleration and deceleration stage (refer to FIG. 13C)".

(A) "number of pulses of acceleration and deceleration stages"="number of acceleration and deceleration stages used in a section" x "unit pulse of acceleration and deceleration stage"

(B) "time of acceleration and deceleration period" is "total drive time for every one pulse of acceleration and deceleration stages that have been used" multiplied by unit pulse of acceleration and deceleration stage.

In the case of FIG. 17C, since acceleration and deceleration stage 1 and acceleration and deceleration stage 2 are used, the following equation is obtained. "time of acceleration and deceleration period"=("drive time for every one pulse of acceleration and deceleration stage 1"+"drive time for every one pulse of acceleration and deceleration stage 2") x "unit pulse for acceleration and deceleration stage" (C) "number of constant speed period pulses"="total number of pulses for a section"—(A)

Next, "time of constant speed period" is calculated. As will be understood from FIG. 9, for example, time of a constant speed period may be calculated by subtracting time for which acceleration and deceleration are performed from a section time, and further subtracting a stop time for direction reversal stop shown in FIG. 8. Accordingly, if tc is made time of a constant speed period, td is made section time (confirmed section time), to is made time of an acceleration and deceleration period, and R (corresponding to t2c in FIG. 8) is made stop time for direction reversal stop, time of a constant speed period can be calculated from the following equation 1.

$$tc = td - ta - R \qquad (1)$$

Figure 18:
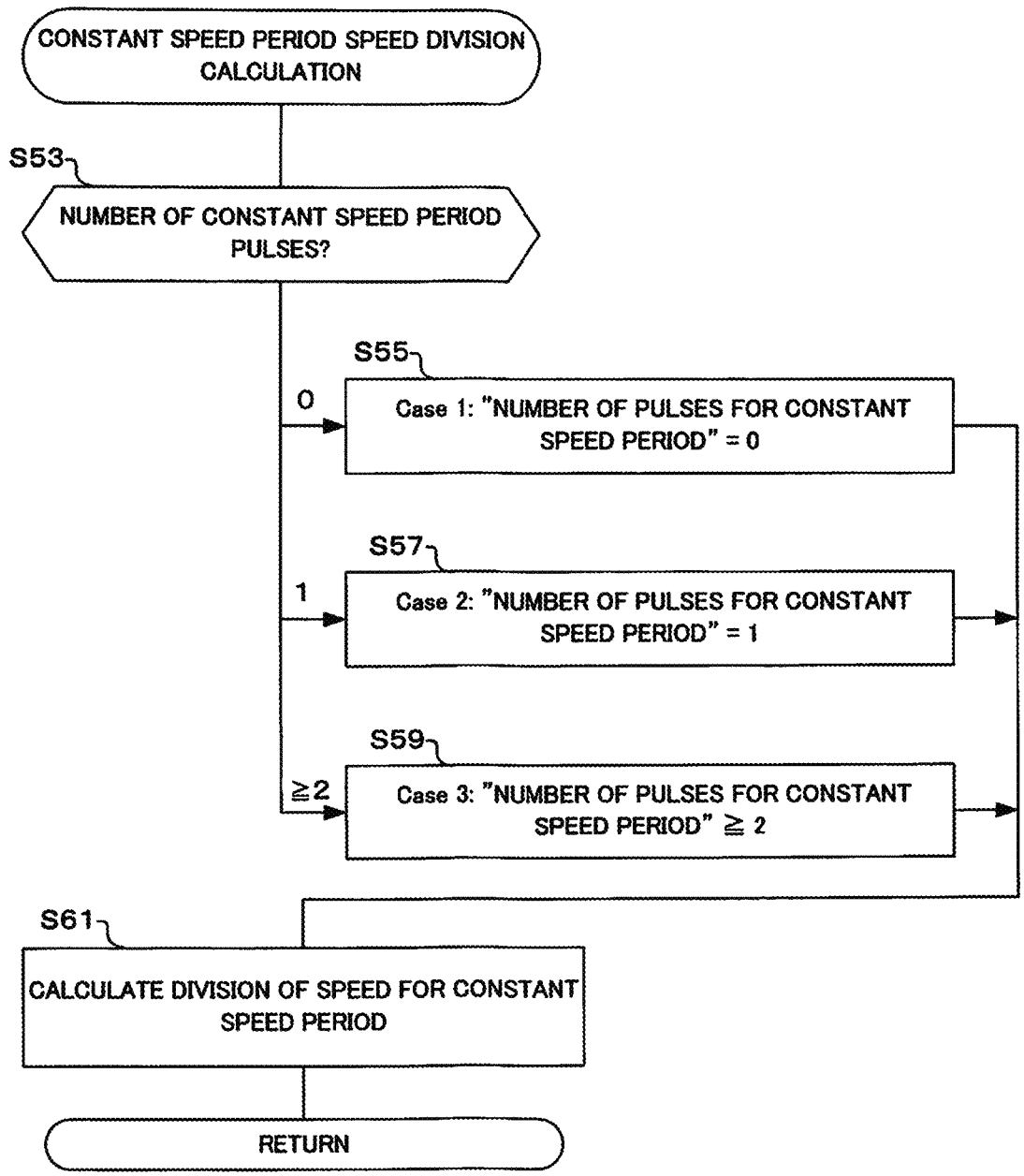
FIG. 18 is a flowchart showing speed division calculation for a constant speed period, in the camera of one embodiment of the present invention.

Next, the calculation for speed division of a constant speed period in step S37 will be described using the flowchart show in FIG. 18.

Number of constant speed period pulses is determined (S53). For example, in the example shown in FIG. 15, in section n+1 a total number of pulses from pls 7 to pls 12 is 6 pulses, and a number of pulses of acceleration and deceleration periods among these is two pulses, namely pls 7 and pls 8. A constant speed period is constituted by the four pulses of the 9th pls to the 12th pls. Also, in the example shown in FIG. 16, a constant speed period is from the 20th pls to the 23rd pls, and is a total of four pulses.

If the result of determination in step S53 is that the number of constant speed period pulses is 0, case 1 is set (S55). Also, if the result of determination in step S53 is that the number of constant speed period pulses is 1, case 2 is set (S57). Also, if the number of constant speed period pulses is 2 or more, case 3 is set (S57).

If there has been classification into case 1 to case 3, constant speed period speed division calculation is performed based on the results of this classification (S61). Two drive times (integral number of the control unit time) that are closest to a constant speed that was calculated in step S35 are selected. And a number of pulses that drive will be performed for the respective drive times is calculated, so as to minimize errors.

Speed division of a constant speed period will be described using FIG. 19. FIG. 19 shows only constant speed period Tc, and acceleration and deceleration periods have been omitted. In FIG. 19 the horizontal axis shows applied pulse pls. The vertical axis shows drive time for every one pulse, and as drive time for every one pulse becomes larger, drive speed becomes lower. As was described previously, drive time for one pulse can only be controlled in control resolution Tres units (control unit time). On the other hand, average time Tave is a value derived by dividing the time of a constant speed period Tc ((4) in S35) by the number of pulses Tn of a constant speed period Tc ((3) in S35). And the average time Tave is an ideal drive time for one pulse, to implement time of a constant speed period Tc ((4) in S35). However, there are cases where average time Tave cannot be realized with limits of control of a control resolution (control unit time). Number of pulses Tn of a constant speed period Tc is determined in (3) step S35, and time Tc of the constant period is determined in (4) of step S35. It should be noted that, as was described previously, it is possible to set a drive time in accordance with integral number of control unit times for each individual drive pulse of a stepping motor.

In FIG. 19, a first time Tfast_t and a second time Tslow_t are drive times for one pulse that can be controlled closest to the average time Tave, and are set to the high speed side and the low speed side with respect to average time Tave. Time of a constant speed period Tc realized by control is a sum of areas of each bar graph in FIG. 19. In step S61 a number of pulses Tn are distributed (divided) into optimum numbers of pulses for first time Tfast_t and second time Tslow_t. As a result of this, time of total constant speed period Tc for this case (area of hatched sections in FIG. 19) is made substantially equal to time of constant speed period TC at the time that drive time for all pulses is made the hypothetical average time Tave ((4) in S35).

The following parameters (a) to (d) are then obtained in step S61.

(a) first time Tfast_T ("drive time for every one pulse" for period Fast)
(b) "number of pulses" of first time Tfast_t (number of pulses of period Fast)
(c) second time Tslow_t ("drive time for every one pulse" for period Slow)
(d) "number of pulses" of second time Tslow_t (number of pulses of period Slow)

If case 1 has been set in step S55, specifically, if the number of pulses of the constant speed period Tc is 0, the parameters obtained in (a) to (d) are all made 0. (since number of pulses=0, stored value for "drive time for every one pulse" representing speed is irrelevant to control)

If case 2 has been set in step S57, specifically, if the number of pulses Tn of the constant speed period Tc is 1, the following parameters are obtained. Specifically, a drive time for every one pulse Tfast for Fast within the constant speed period Tc is calculated based on equation (2) below, if constant speed period is made Tc, number of pulses of the constant speed period is made Tn, and control unit time (control resolution) is made Tres.

$$\text{Tfast}\_t = (Tc \div Tn \div Tres) \times Tres \qquad (2)$$

Also, in the case of case 2, a number of pulses of period Fast within the constant speed period Tc is 1, and so a number of pulses for period Slow within the constant speed period Tc is 0. Since number of pulses is 0, it is irrelevant to control, but "drive time for every one pulse" is also set to 0.

Next, in step S59, if case 3 has been set, if a number of pulses Tc of the constant speed period is 2 or more, two speeds of "drive time for every one pulse" that has been calculated as time÷number of pulses (with decimal point truncated), and "drive time for every one pulse" that is longer by the control unit time, are obtained, and constant speed period Tc is distributed.

First, a "drive time for every one pulse" Tfast_t for a period Fast within the constant speed period is calculated from equation (3) below, using time Tc of the constant speed period, number of constant speed period pulses Tn, and control unit time Tres. At the time of this calculation, the content of equation (3) within parenthesis is truncated after the decimal point.

$$\text{Tfast}\_t = (Tc \div Tn \div Tres) \times Tres \qquad (3)$$

If equation (3) above has been calculated, then "drive time for every one pulse" Tslow_t for a period Slow within the constant speed period is calculated from equation (4) below.

$$Tslow\_t = Tfast\_t + Tres \quad (4)$$

Next, a number of pulses Tn_slow for the period Slow within the constant speed period Tc is calculated from equation (5) below. It should be noted that at the time of this calculation, the content of equation (5) withing parenthesis is truncated after the decimal point.

$$Tn\_slow = (Tc - Tn \times Tfast\_t) \div Tres \quad (5)$$

Once equations (4) and (5) above have been computed, next, a number of pules Tn_fast for a period Fast within the constant speed period Tc is calculated from equation (6) below.

$$Tn\_fast = Tn - Tn\_slow \quad (6)$$

Using the above equations (3) to (6) it is possible to obtain the above described parameters (a) to (d).

Next, the fact that it is possible to make time errors until each lens reaches the position corresponding to the zoom position small, using the speed division of the constant speed period Tc of this embodiment, will be described using FIG. 20 to FIG. 22.

Figure 20:
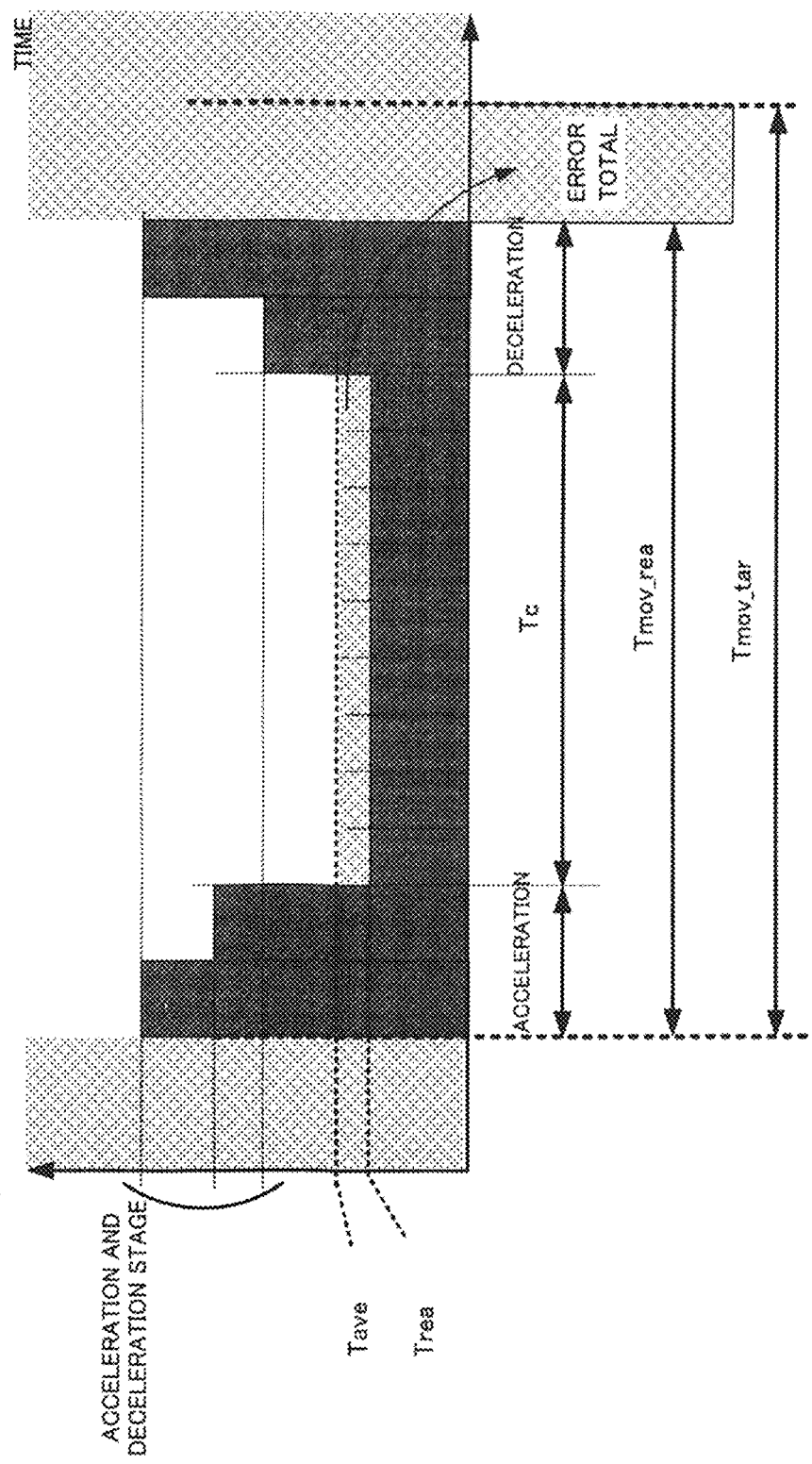
FIG. 20 is a drawing for describing errors that occur due to constant speed period, in the camera of one embodiment of the present invention.

FIG. 20 shows a case where division of speed of the constant speed period Tc is not performed. In FIG. 20, both the constant speed period Tc and the acceleration and deceleration periods are included, with the horizontal axis representing time. With this example, all pulses of the constant speed period Tc are driven with the real control value Trea closest to calculated values for drive time for every one pulse (corresponding to average time Tave in FIG. 19) with respect to control resolution (control unit time). In this case, a difference between calculated value Tave and a real control value Trea within the constant speed period Tc (lightly hatched area within the constant speed period Tc in FIG. 20) constitutes an error total relating to time of the constant speed period Tc. This means that if, in the constant speed period Tc, there is control using the actual drive time Tmov_rea rather than the target drive time Tmov_tar, the time of arrival at the next zoom position Zp will be earlier by the error total. And a time of waiting until other lenses reach a specified position (wait time) is increased. Alternatively, it is considered that the lens is stopped at the next zoom position, recalculation will occur.

Figure 21:
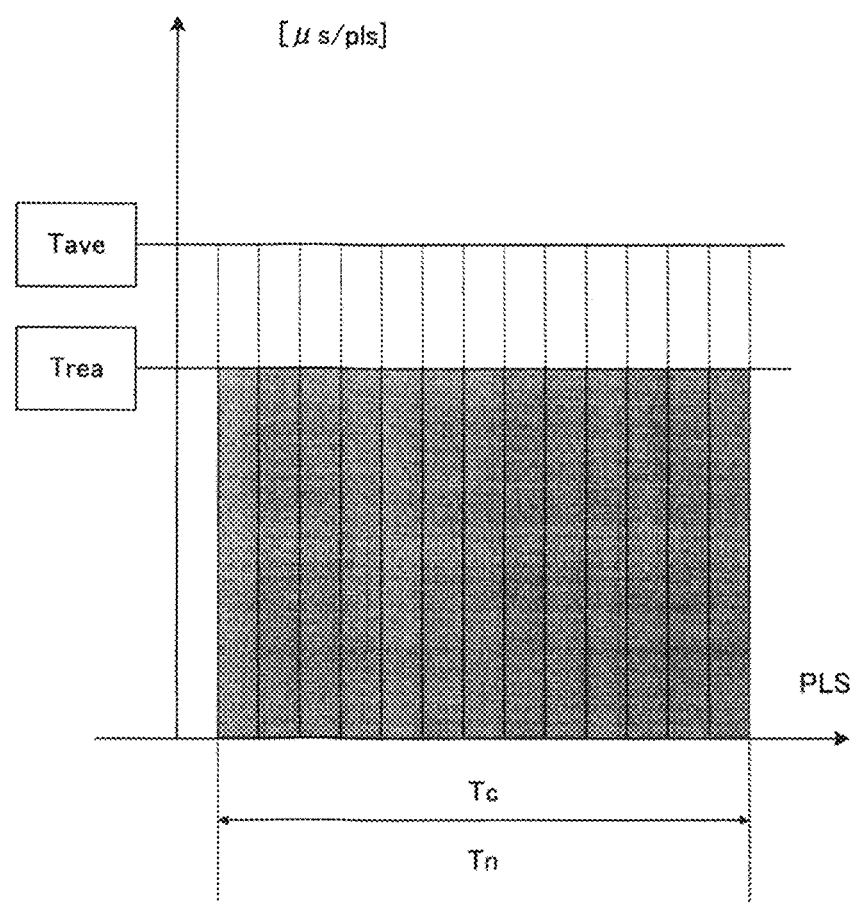
FIG. 21 is a drawing for describing errors by comparing with conventional constant speed period drive time, in the camera of one embodiment of the present invention.

FIG. 21 shows a case where division of speed is not performed during the constant speed period Tc, and is shown for the purpose of comparison with the case of performing division of speed during the constant speed period Tc of FIG. 19. Similarly to FIG. 19, FIG. 21 shows only the constant speed period Tc, and acceleration and deceleration periods are omitted (corresponding to constant speed period Tc in FIG. 20). As shown in FIG. 21 a value that has been derived by multiplying a difference, between the average time Tave and a time used in actual control Trea, by a number of pulses Tn (area of sections that are not hatched within the constant speed period Tc) constitutes a time error from constant speed period Tc that is made a target. As shown in FIG. 19, by allocating respectively different drive times (first time Tfast_t and second time Tslow_t) by dividing the constant speed period Tc into a first period Fast and a second period Slow, it is possible to get closer to the intended time of the constant speed period Tc. Specifically, using two speeds that can be controlled (drive times) and distribution of number of pulses, it is possible to keep time errors that occur within the constant speed period Tc below the control resolution (control unit time).

FIG. 22 shows a case where division of speed of the constant speed period Tc has been performed. Similarly to FIG. 20, the constant speed period Tc and the acceleration and deceleration periods are included, with the horizontal axis representing time. Compared to the case of FIG. 20, in the constant speed period Tc the drive time for every one pulse is divided into a period Fast and a period Slow for the two speeds of first time Tfast_t and second time Tslow_t. As a result, in the constant speed period Tc the actual drive time Tmov_rea becomes closer to the target drive time Tmov_tar than in the case of FIG. 20. As a result, in the constant speed period Tc, a difference between an area of the bar graph corresponding to the two drive times Tfast_t and Tslow_t, and an area of the bar graph corresponding to Tave, namely the error total, is reduced compared to the case of FIG. 20.

In this way, the zoom lens 250, focus lens 253, and correction lens 254 respectively have speeds of the constant speed period Tc (drive times) that approach the calculated speeds, as a result of combining pulses of two drive times (called speed division). As a result, for each zoom position Zp it is possible for each lens to arrive at a specified position at substantially the same time. If zoom positions Zp are set densely between the telephoto end and the wide-angle end, precision of controlling each lens position during the drive of the lenses is improved. And it is possible to further improve image quality of live view image and/or movie images.

Next, a modified example of arrangement order for pulses of the first time Tfast_t and the second time Tslow_t of the constant speed period Tc will be described using FIG. 23. In one embodiment, drive time for an initial plurality of pulses that are continuous was made a first time, and drive time for the next plurality of pulses that are continuous is made a second time. Conversely, with this modified example drive time for an initial single pulse is made a first time, drive time for the next single pulse is made a second time, and the next two pulses are respectively made the first time and the second time. After that, a first time for a single pulse and a second time for two pulses is alternately repeated three times. In this way, the zoom lens 250, focus lens 253, and correction lens 254 respectively have speeds of the constant speed period Tc that approach the calculated speeds, as a result of changing the order of pulses of two drive times, and combining.

Figure 23:
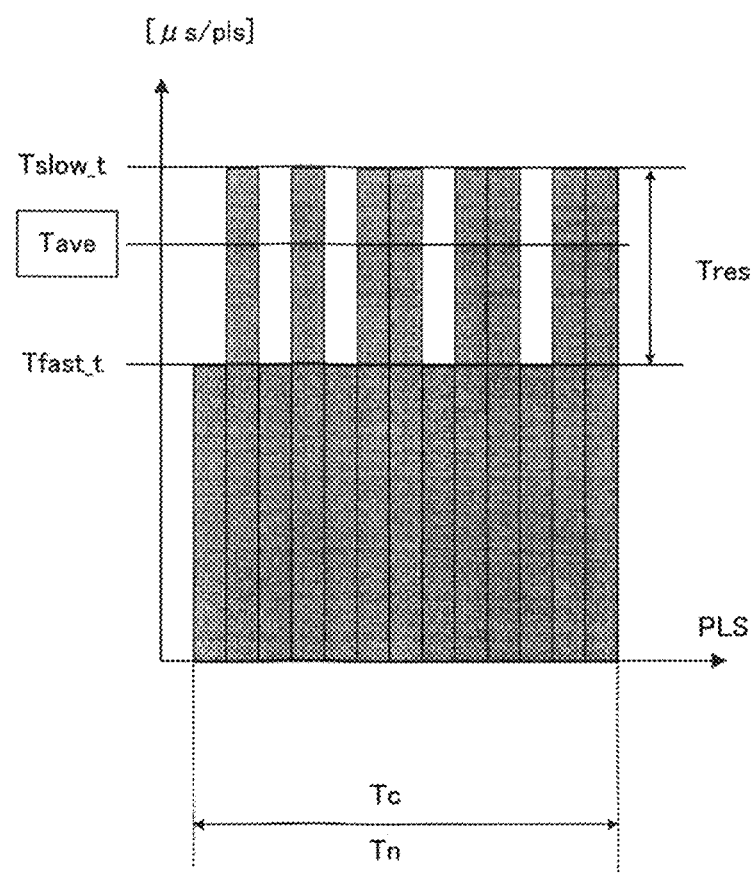
FIG. 23 is a flowchart showing a modified example of speed division for a constant speed period, in the camera of one embodiment of the present invention.

It should be noted that the modified example is not limited to the example shown in FIG. 23, and, for example, drive time for an initial plurality of continuous pulses may be made a second time, and after that drive time for a plurality of continuous pulses may be made a first time. Also, not being limited to the example shown in FIG. 23, drive may be alternated every two pulses, and further drive may be alternated every three pulses or more.

As has been described above, with the one embodiment and modified examples of the present invention, in zoom tracking, between zoom positions that make up positions of a plurality of lenses is made a "section", and movement speeds of a plurality of lenses are controlled so that a "sections" becomes a "predetermined time". A time for moving through a predetermined "section" is made a "predetermined time", shortest time for which control is possible in a "section" is calculated for every lens (refer to S31 in FIG. 11), and if there is a lens that has a shortest time that is longer than the "predetermined time", the "predetermined time" is extended (refer to S33 in FIG. 11, and to FIG. 12B). This excessive lens shortest time is made the "predetermined time". If a drive time for one pulse, where a drive time required to move the lens through a "section" is a "predetermined time (confirmed section time td (refer to FIG. 12B))", is made "average time (predetermined time/number of drive pulses)", "two drive times" are provided either side of "average time" in accordance with control resolution (control unit time), and a number of pulses determined by the respective drive times are distributed so that a "section" becomes a "predetermined time" (refer to S37 in FIG. 11, and to FIG. 18 and FIG. 19).

Also, with the one embodiment and modified examples of the present invention, when controlling a first stepping motor that drives a zoom lens and a second stepping motor that drives a focus lens, there is a period in which at least one of the first stepping motor and the second stepping motor is driven at a constant speed (refer, for example, to the constant speed period Tc in FIG. 22). When a drive time, that has been derived by dividing drive time for all drive pulses of a period in which there is drive at constant speed by a number of pulses of that period, is made average drive time (refer, for example, to the average time Tave in FIG. 21(b)), the period in which there is drive at a constant speed is divided into a plurality of periods, and a plurality of the drive times either side of the average drive time are set to the drive pulses of the plurality of periods (refer, for example to S37 in FIG. 11, S61 in FIG. 18, and to the drive time for every one pulse within the constant speed period of FIG. 22), in order to make a time, required for the zoom lens and the focus lens to move through the given section with a specified number of pulses, a specified time (refer to confirmed section time td in FIG. 12B, for example). As a result of this, precision of lens position during lens drive is ensured, and it is possible to improve the appearance of live view images and/or movie images.

It should be noted that with the one embodiment and modified examples of the present invention, there is a correction lens 254, and a stepping motor for driving the correction lens 254 also, similarly to the stepping motors for driving the zoom lens 250 and the focus lens 253, has a constant speed period divided into a plurality of periods, and has a plurality of drive times either side of an average drive time set to drive pulses of a plurality if periods. However, this is not limiting and in a case of a photographing lens that does not include the correction lens 254 this drive control need not be performed, and even if the correction lens 254 is included this drive control may be omitted.

Also, with one embodiment of the present invention, chips for the image sensor drive IC 110, image processing IC 102, motor driver 120, SDRAM 103 etc. are constituted by chips that are separate to the control microcomputer 101, but some of these sections may share the same chip, and some chips may be divided. Also, instead of hardware circuits that have been provided on these chips, the present invention may also be constructed in the form of software using a CPU and programs, or may be constructed in hardware such as gate circuitry generated based on a programming language described using Verilog, or may be constructed using a DSP (digital signal processor). Suitable combinations of these approaches may also be used.

Also, without limiting to a CPU, there may be components that fulfill functions as a controller, and processing for realizing each of the functions may be performed by one or more processors constructed as hardware. For example, each section may be a processor constructed as respective electronic circuits, and may be respective circuits sections of a processor that is constructed with an integrated circuit such as an FPGA (Field Programmable Gate Array). Alternatively, a processor that is constructed with one or more CPUs may execute functions of each section, by reading out and executing computer programs that have been stored in a storage medium.

Also, with this embodiment, a device for taking pictures has been described using a digital camera, but as a camera it is also possible to use a digital single lens reflex camera, a mirrorless camera, or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a medical camera (for example, a medical endoscope), or a microscope, an industrial endoscope, a camera for mounting on a vehicle, a surveillance camera etc. In any event, it is possible to apply the present invention to any device that has a photographing lens that is capable of changing focal length.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' unit,'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A lens control device having a photographing lens that is capable of zoom and focus, comprising:
   a first stepping motor that drives a zoom lens contained in the photographing lens;
   a second stepping motor that drives a focus lens contained in the photographing lens; and
   a processor that is capable of setting drive times in accordance with a specified control unit time for each of respective drive pulses of the first stepping motor and the second stepping motor, and that controls the first stepping motor and the second stepping motor, whereby
   within a given section in which the zoom lens and the focus lens are driven, there is a period in which at least one of the first stepping motor and the second stepping motor is driven at a constant rate, and
   the processor, in order to make a time, required to drive at least one of the first stepping motor and the second stepping motor by a specified number of drive pulses during the period in which there is drive at the constant rate, match a specified time,
   when a drive time per one drive pulse, that has been derived by dividing drive time for all drive pulses of a period in which there is drive at the constant rate by the specified number of drive pulses, is made average drive time,
   divides the period in which there is drive at the constant rate into a plurality of per ids, calculates two of the drive times that are different from each other by the control unit time, on either side of the average drive time, and sets one of the two drive times, that are different from each other by the control unit time, as a drive time for every drive pulse of the plurality of periods.

2. The lens control device of claim 1, further comprising a memory, wherein;
   specified reference times corresponding to respective sections, where a range in which zoom position of the zoom lens can be changed has been divided into a plurality of sections, are stored in the memory; and
   the processor reads out the specified reference time corresponding to the specified section, among the plurality of sections, and calculates the time required to drive at least one of the first stepping motor and the second stepping motor by a specified number of drive pulses during the period in which there is drive at the constant rate, by subtracting a time required for acceleration and deceleration of the first stepping motor and the second stepping motor from the specified reference time that has ben read out.

3. The lens control device of claim 2, wherein;
   section pulse values corresponding to respective sections, where a range in which zoom position of the zoom lens can be changed has been divided into a plurality of sections, are stored in the memory; and
   the processor reads out the section pulse value corresponding to the specified section, among the plurality of sections, and calculates the specified number of drive pulses by subtracting a number of drive pulses required for acceleration and deceleration of the first stepping motor and the second stepping motor from the section pulse value that has been read out.

4. The lens control device of claim 1, further comprising:
   a third stepping motor that drives a second zoom lens contained in the photographing lens; and wherein
   there is a period in which at least one of the first stepping motor, second stepping motor, and third stepping motor are driven at a constant rate,
   in order to make a time, required to move by a specified number of drive pulses in a period in which the zoom lens, the focus lens and the second zoom lens are driven at a constant rate, match a predetermined time, the period in which there is drive at the constant rate is divided into a plurality of periods, and one of two drive times on either side of the average time, that are different from each other by the control unit time, is set.

5. The lens control device of claim 1, wherein:
   the processor sets one drive time, of the two drive times on either side of the average drive time, to the drive pulses for first period that has continuous drive pulses among the plurality of periods, and sets the other drive time to drive pulses for second period that has continuous drive pulses among the plurality of periods.

6. The lens control device of claim 1, wherein:
   the processor sets one drive time, of the two drive times on either side of the average drive time, to the drive pulses for first periods that are dispersed among the plurality of periods, and sets the other drive time to drive pulses for second periods that are dispersed among the plurality of periods.

7. A lens control method for an imaging device that comprises a photographing lens that is capable of zoom and focus, a first stepping motor that drives a zoom lens contained in the photographing lens, and a second stepping motor that drives a focus lens contained in the photographing lens, comprising:
   being able to set drive times in accordance with a specified control unit time tor each of respective drive pulse of the first stepping motor and the second stepping motor, and, when controlling the first stepping motor and the second stepping motor,
   within a given section in which the zoom lens and the focus lens are driven, having a period in which at least one of the first stepping motor and the second stepping motor is driven at a constant rate, and,
   in order to make a time, required to drive at least one of the first stepping motor and the second stepping motor by a specified number of drive pulses during the period in which there is drive at the constant rate, match a specified time,
   when a drive time per one drive pulse, that has been derived by dividing drive time for all drive pulses of a period in which there is drive at the constant rate by the specified number of drive pulses, is made average drive time,
   dividing the period in which there is drive at the constant rate into a plurality of periods, calculating two of the drive times that are different from each other by the control unit time, on either side of the average drive time, and setting one of the two drive times, that are different from each other by the control unit time, as a drive time for every drive pulse of the plurality of periods.

8. The lens control method of claim 7, further comprising:
   dividing a range in which zoom position of the zoom lens can be changed into a plurality of sections,
   storing specified reference times corresponding to respective sections in a memory,
   reading out the specified reference time corresponding to the specified sect ion, among the plurality of sections, and respectively calculating the time required to drive at least one of the first stepping motor and the second stepping motor by a specified number of drive pulses during the period in which there is drive at the constant rate, by subtracting a time required for acceleration and deceleration of the first stepping motor and the second stepping motor from the specified reference time that has been read out.

9. The lens control method of claim 8, further comprising: extending the specified time to a shortest time, that exceeds the specified reference time.

10. The lens control method of claim 7, wherein the imaging device further comprises a third stepping motor for driving a second zoom lens contained in the photographing lens, wherein:
there is a period in which at least one of the first stepping motor, second stepping motor, and third stepping motor are driven at a constant rate,
and the method further comprises setting a time or the period, in order to make a time, required to move by a specified number of drive pulses in a period in which the zoom lens, the focus lens and the second zoom lens are driven at a constant rate, match a predetermined time, dividing the period into a plurality of periods, and setting one of two drive times on either side of the average time, that are different from each other by the control unit time.

11. The lens control method of claim 7, further comprising:
setting the two drive times on either side of the average drive time so that there is a difference corresponding to the control unit times.

12. The lens control method of claim 11, further comprising:
setting one drive time, of the two drive times on either side of the average drive time, to the drive pulses for first period that has continuous drive pulses among the plurality of periods, and setting the other drive time to drive pulses for second period that has continuous drive pulses among the plurality of periods.

13. The lens control method of claim 11, further comprising:
setting one drive time, of the two drive times on either side of the average drive time, to the drive pulses for first periods that are dispersed among the plurality of periods, and setting the other drive time to drive pulses for second periods that are dispersed among the plurality of periods.

14. A non-transitory computer-readable medium storing a processor executable code, which when executed by at least one processor, this processor belong provided in an imaging device that comprises a photographing lens that is capable of zoom and focus, a first stepping motor that drives a zoom lens contained in the photographing lens, and a second stepping motor that drives a focus lens contained in the photographing lens, performs a lens control method, the lens control method comprising:
being able to set drive times in accordance with specified control unit time for each of respective drive pulse of the first stepping motor and the second stepping motor, and, when controlling the first stepping motor and the second stepping motor,
within a given section in which the zoom lens and the focus len: are driven, having a period in which at least one of the first stepping motor and the second stepping motor is driven at a constant rate, and,
in order to make a time, required to drive at least one or the first stepping motor and the second stepping motor by a specified number of drive pulses during the period in which there is drive at the constant rate, match a specified time,
when a drive time per one drive pulse, that has been derived by dividing drive time for all drive pulses of a period in which there is drive at the constant rate by the specified number of drive, is made average drive time,
dividing the period in which there is drive at the constant rate into a plurality of periods, calculating two of the drive times that are different from each other by the control unit time, on either side of the average drive time, and setting one of the two drive times, that are different from each other by the control unit time, as a drive time for every-drive pulse of the plurality of periods.

15. The non-transitory computer-readable medium of claim 14, storing further processor executable code, which when executed by the at least one processor, causes the at least one processor to perform a method further comprising:
dividing a range in which zoom position of the zoom lens can be changed into a plurality of sections, storing specified reference times corresponding to respective sections in a memory, reading out the specified reference time corresponding to the specified section, among the plurality of sections, and respectively calculating the time required to drive at least one of the first stepping motor and the second stepping motor by a specified number of drive pulses during the period in which there is drive at the constant rate, by subtracting a time required for acceleration and deceleration of the first stepping motor and the second stepping motor from the specified reference time that has been read out.

16. The non-transitory computer-readable medium of claim 14, storing further processor executable code, which when executed by the at least one processor, causes the at least one processor to perform a method further comprising:
extending the specified time to a shortest time, that exceeds the specified reference time.

17. The non-transitory computer-readable medium of claim 15, storing further processor executable code, wherein the imaging device in which the processor is further provided with a third stepping motor that drives a second zoom lens contained in the photographing lens, wherein when the further processor executable code is executed by the at least one processor, the at least one processor is caused to perform a method further comprising:
having a period in which at least one of the first stepping motor, second stepping motor, and third stepping motor are driven at a constant rate,
in order to rake a time, required to move by a specified number of drive pulses in a period in which the zoom lens are driven at a constant rate, match a predetermined time, the period in which there is drive at the constant rate is divided into a plurality of periods, and setting one of two drive times on either side of the average time, that are different from each other by the control unit time.

18. The non-transitory computer-readable medium of claim 14, storing further processor executable code, which when executed by the at least one processor, causes the at least one processor to perform a method further comprising:
setting the two drive times on either side of the average drive time so that there is a difference corresponding to the control unit times.

19. The non-transitory computer-readable medium of claim 17, storing further processor executable code, which, when executed by the at least one processor, causes the at least one processor to perform a method further comprising:
  setting one drive time, of the two drive times on either side of the average drive time, to the drive pulses for first period that has continuous drive pulses among the plurality of periods, and setting the other drive time to drive pulses for second period that has continuous drive pulses among the plurality of periods.

20. The lens control device of claim 2, wherein;
  the processor respectively calculates shortest times for which movement of the zoom lens and focus lens is possible within the specified sections, for the specified sections, and in the event that both of the shortest times do not exceed the specified reference time, does not change the specified reference time, while if at least one of the shortest times exceeds the specified reference time, the larger of the shortest times is made the specified reference time.

21. The lens control method of claim 8, further comprising:
  respectively calculating shortest times for which movement of the zoom lens and focus lens is possible within the specified sections, for the specified sections, and in the event that both of the shortest times do not exceed the specified reference time, does not change the specified reference time, while if at least one of the shortest times exceeds the specified reference time, the larger of the shortest times is made the specified reference time.

22. The non-transitory computer-readable medium of claim 15, storing further processor executable code, which when executed by the at least one processor, causes the at least one processor to perform a method further comprising:
  respectively calculating shortest times for which movement of the zoom lens and focus lens is possible within the specified sections, for the specified sections, and in the event that both of the shortest times do not exceed the specified reference time, does not change the specified reference time, while if at least one of the shortest times exceeds the specified reference time, the larger of the shortest times is made the specified reference time.

* * * * *